United States Patent
Gregory

(10) Patent No.: US 9,657,710 B2
(45) Date of Patent: May 23, 2017

(54) DYNAMIC TUNING FOR WAVE ENERGY CONVERSION

(71) Applicant: Bruce Gregory, London (GB)

(72) Inventor: Bruce Gregory, London (GB)

( * ) Notice: Subject to any disclaimer, the term of this patent is extended or adjusted under 35 U.S.C. 154(b) by 0 days.

(21) Appl. No.: 13/632,074

(22) Filed: Sep. 30, 2012

(65) Prior Publication Data

US 2014/0117671 A1    May 1, 2014

(30) Foreign Application Priority Data

Sep. 3, 2011 (GB) .............. GB1116881.2

(51) Int. Cl.
*F03B 13/22* (2006.01)
*F03B 13/20* (2006.01)
*F03B 13/16* (2006.01)

(52) U.S. Cl.
CPC .............. *F03B 13/22* (2013.01); *F03B 13/16* (2013.01); *F03B 13/20* (2013.01); *F05B 2270/18* (2013.01); *Y02E 10/38* (2013.01)

(58) Field of Classification Search
CPC .......... Y02E 10/38; F03B 13/20; F03B 13/16; F03B 13/1845; F03B 13/22; F03B 2270/18
USPC ........................................................ 290/53
See application file for complete search history.

(56) References Cited

U.S. PATENT DOCUMENTS

| 5,132,550 | A | 7/1992 | McCabe | |
| 7,140,180 | B2* | 11/2006 | Gerber et al. | 60/496 |
| 7,443,046 | B2* | 10/2008 | Stewart et al. | 290/53 |
| 7,755,224 | B2 | 7/2010 | Beane | |
| 8,093,736 | B2 | 1/2012 | Raftery | |
| 8,198,745 | B2 | 6/2012 | Laz et al. | |
| 8,264,093 | B2* | 9/2012 | Moore | 290/42 |
| 8,519,557 | B2* | 8/2013 | Beane | 290/53 |
| 8,629,572 | B1* | 1/2014 | Phillips | 290/53 |
| 8,701,403 | B2* | 4/2014 | Beane | F03B 13/20 290/42 |
| 8,713,928 | B2* | 5/2014 | Gregory | 60/398 |
| 2009/0084296 | A1 | 4/2009 | McCormick | |
| 2011/0061376 | A1* | 3/2011 | McAlister | 60/498 |
| 2011/0089689 | A1 | 4/2011 | Gregory | |
| 2012/0139261 | A1* | 6/2012 | Dick et al. | 290/1 C |

(Continued)

OTHER PUBLICATIONS

Sample Format for Revised Amendment Practice (Rev. Jun. 2003), USPTO.*

*Primary Examiner* — Michael Zarroli

(57) ABSTRACT

Dynamic tuning of the oscillating buoyant body of a wave energy converter over a range of periods that characterize energetic swell is achieved by controlling the ratio of total mass moment of inertia to restoring force and by controlling wave bridging. Mass is varied by locking and unlocking neutrally buoyant masses or by trapping and releasing seawater. For surging, water-plane area is forcibly varied. For rotational variants of heaving and surging and for pitching, the radius of gyration is varied. Invariant mass is reduced by using materials and structures with high ratios of strength to weight. Invariant added mass is reduced by streamlining, by constant radius body profiles and by keeping moving structures out of the water. Added mass is varied by using variable angle fins. Control of wave bridging, for a pitching body, including a wave following device, is by locking and unlocking serial segments of the buoyant body.

20 Claims, 16 Drawing Sheets

(56) References Cited

U.S. PATENT DOCUMENTS

2013/0008164 A1\* 1/2013 Cunningham et al. ...... 60/641.8
2013/0082465 A1\* 4/2013 Frich .............................. 290/53

\* cited by examiner

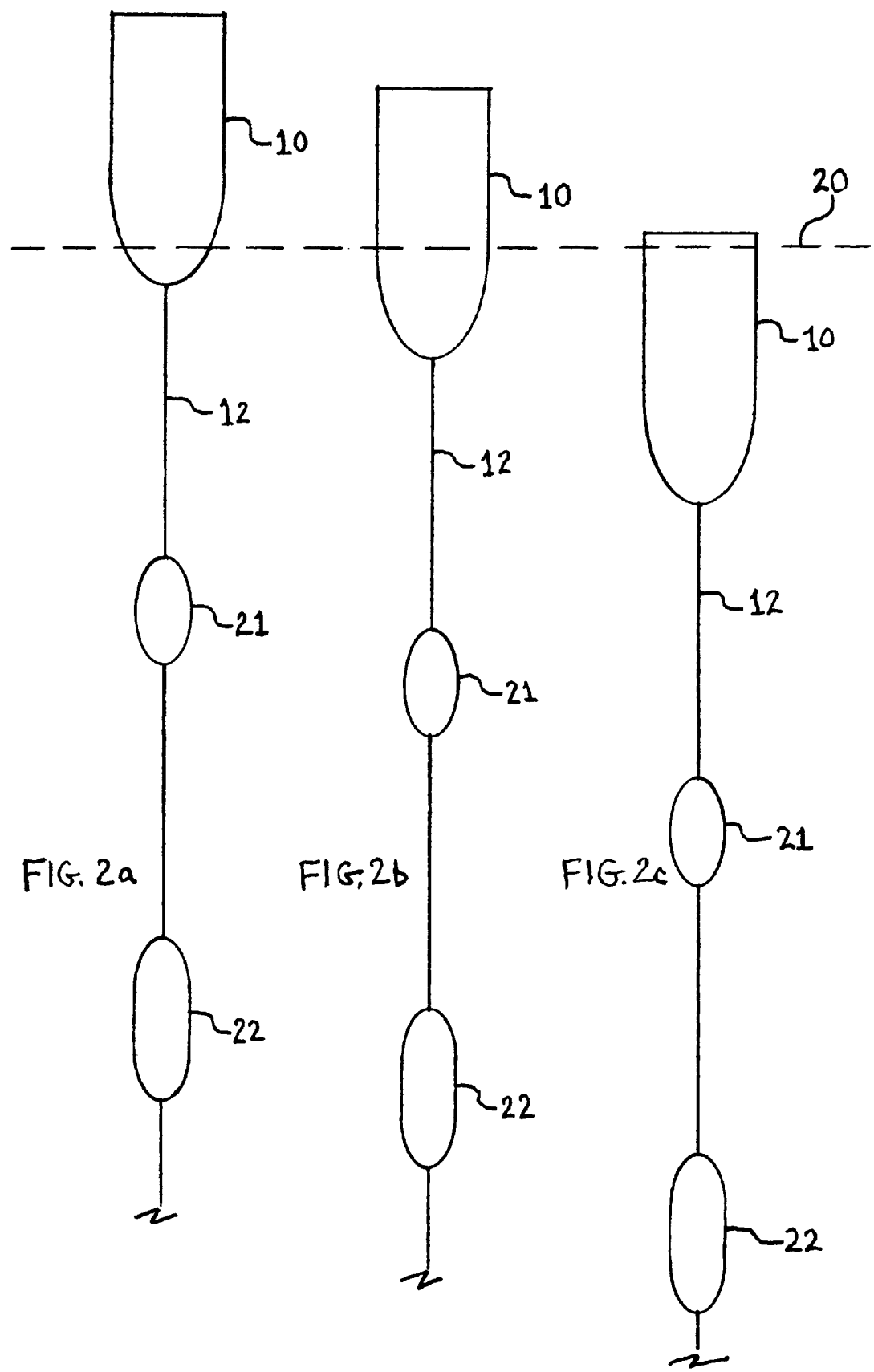

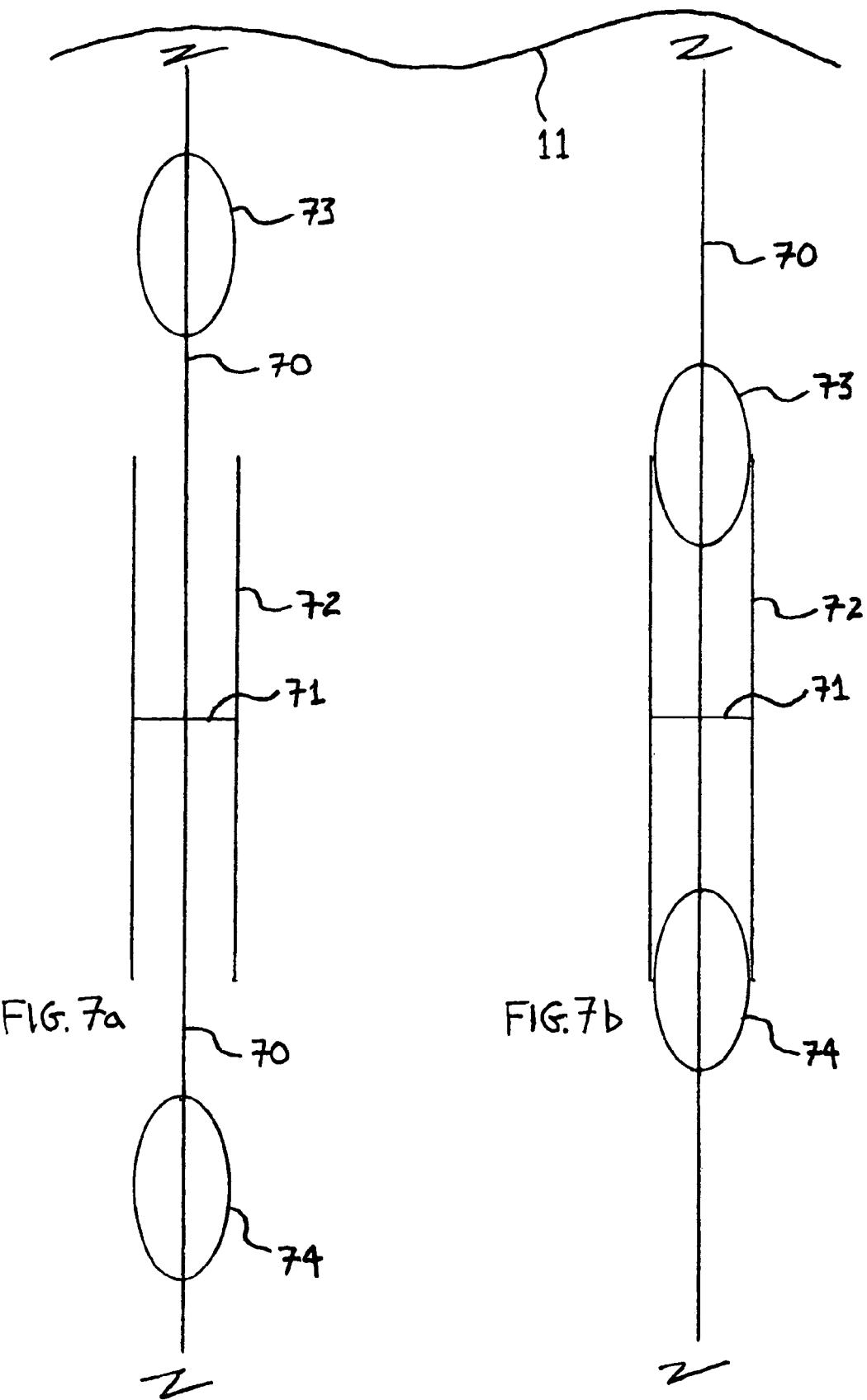

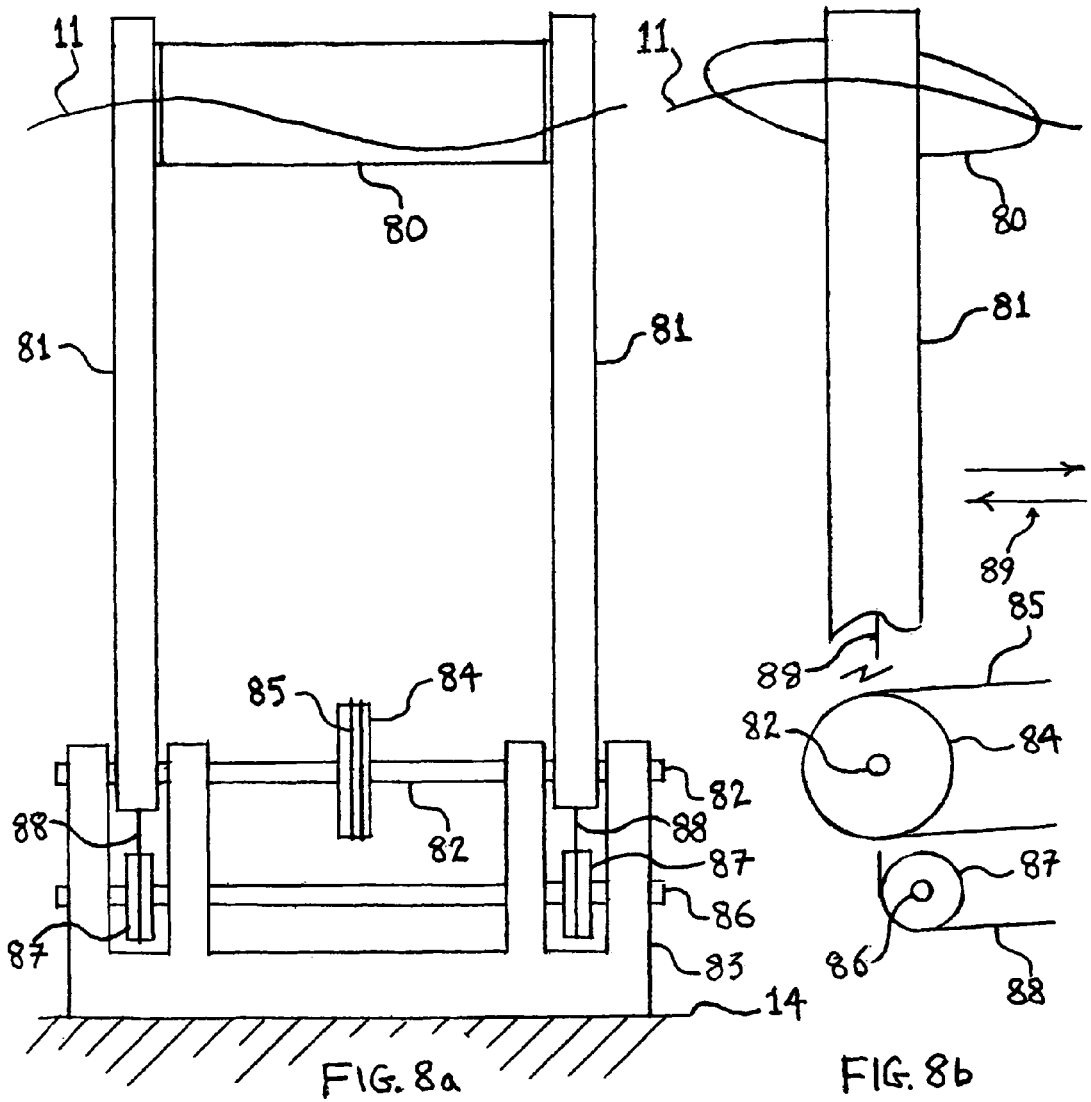
FIG. 8a
FIG. 8b
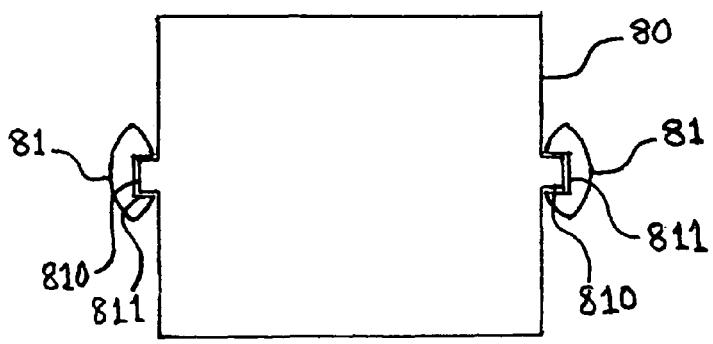
FIG. 8c

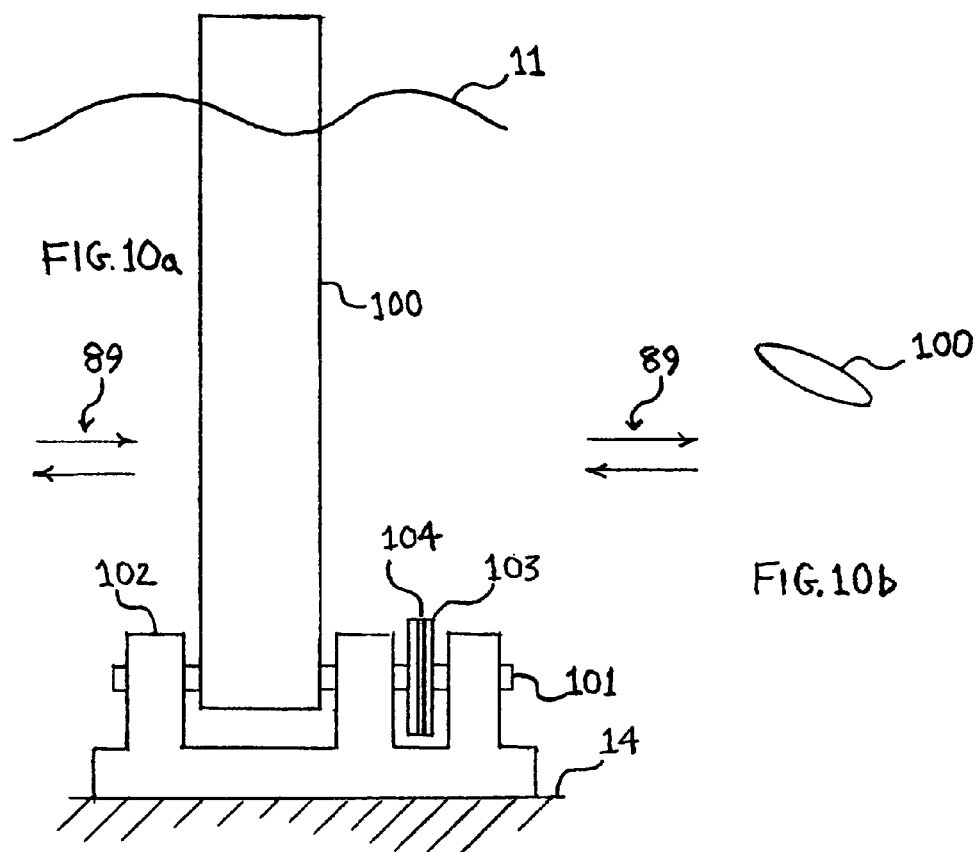
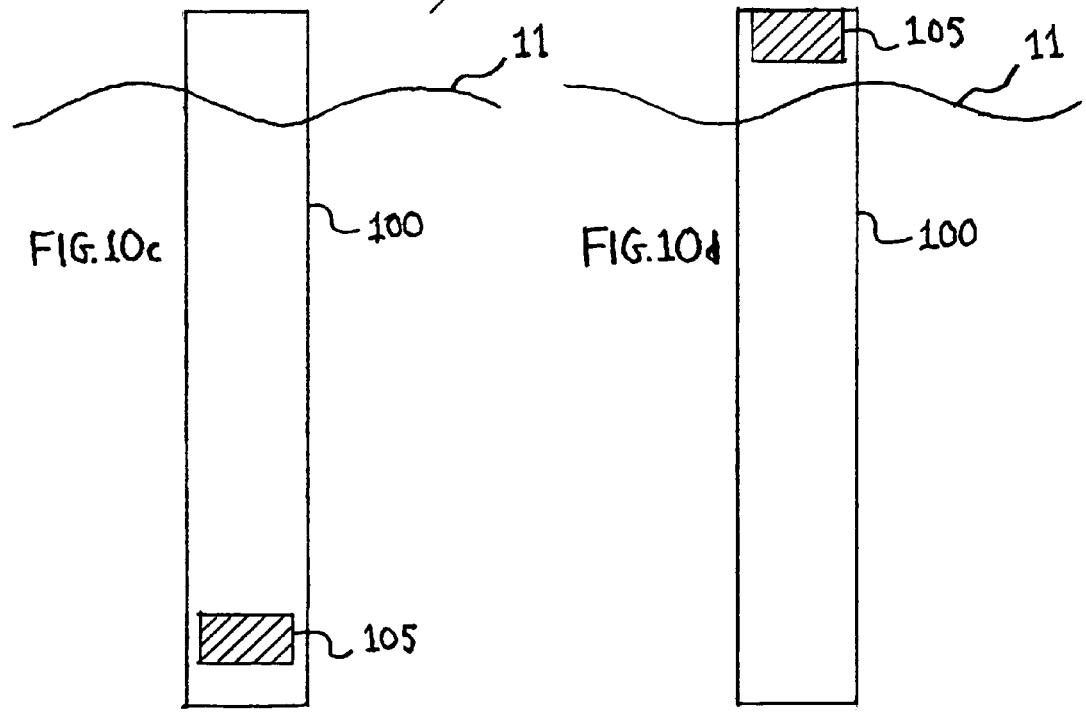

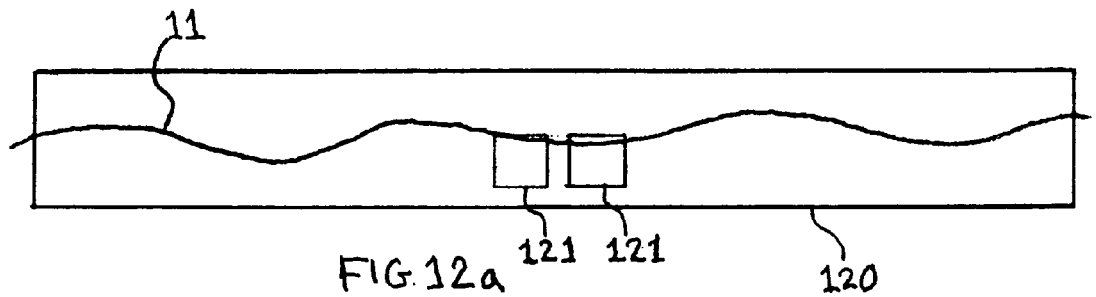
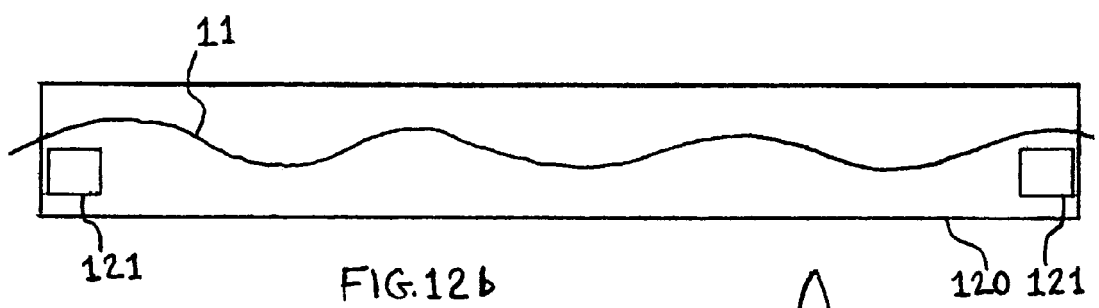
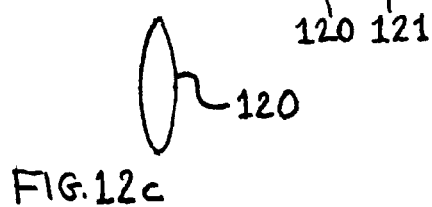
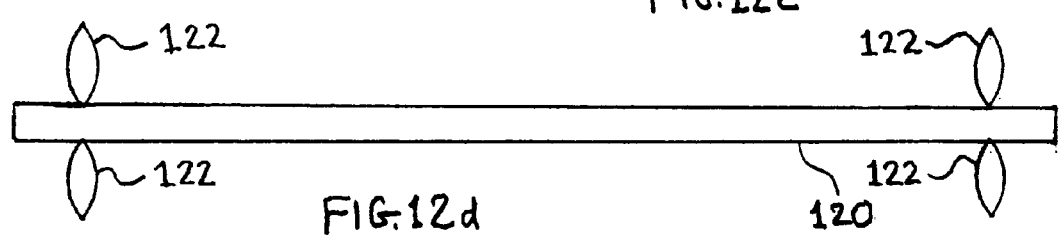
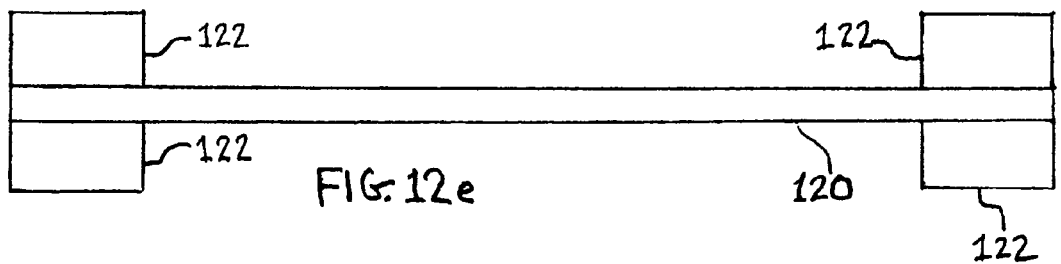
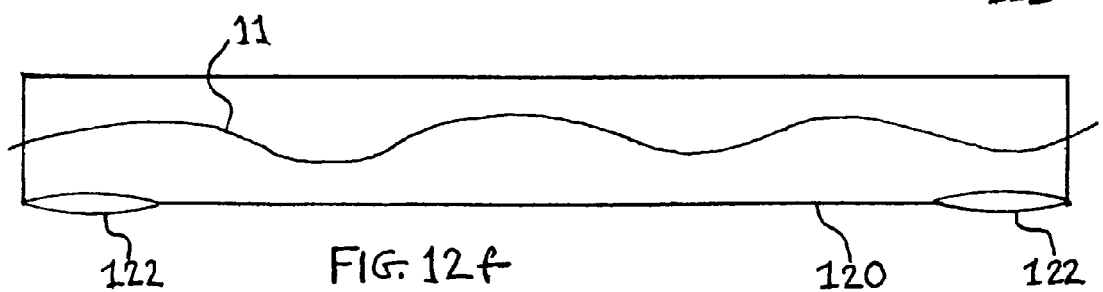

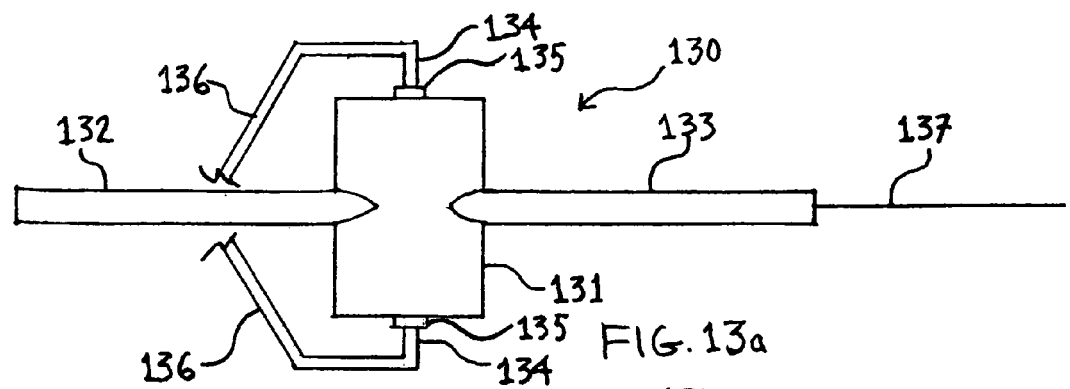
FIG. 13a
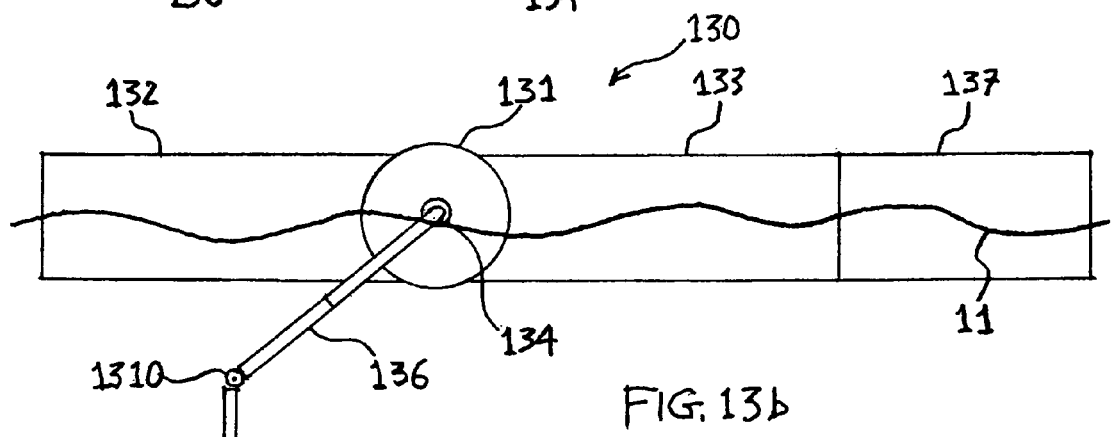
FIG. 13b
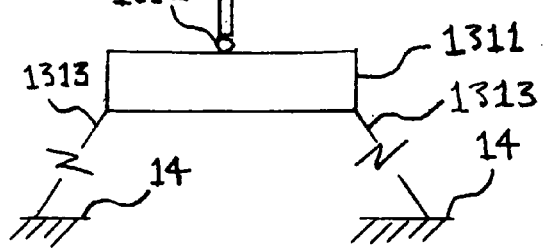
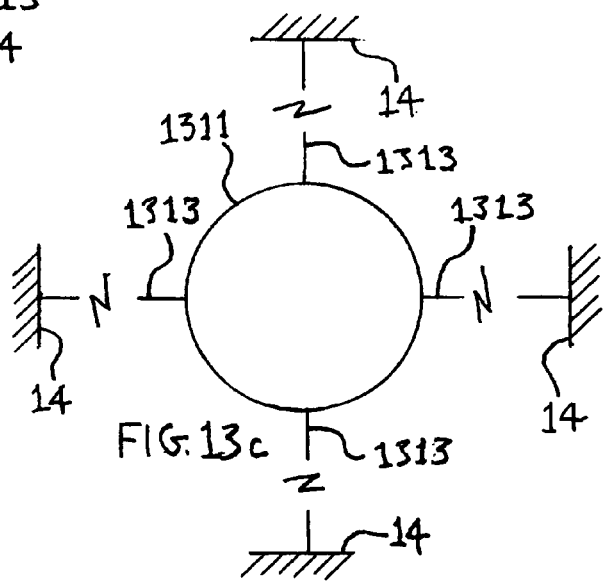
FIG. 13c

DYNAMIC TUNING FOR WAVE ENERGY CONVERSION

RELATED APPLICATIONS

UK patent application GB 1116881.2 filed 30 Sep. 2011, is hereby incorporated by reference.

FIELD OF INVENTION

Oceanic wave energy conversion.

BACKGROUND OF THE INVENTION

Large amounts of wave energy are potentially available, with especially favorable locations in, for example, the UK, Ireland, the USA, Australia and New Zealand. Wave energy can be produced with low carbon emissions and can be part of the solution to the risks of global warming.

There has been much interest in wave energy. Around 1,500 wave energy patents have been published worldwide over the last 100 years. Around 50 companies worldwide are trying to develop wave power. So far there has been no successful commercial megawatt-scale generation of power from waves.

The main obstacles to such implementation are poor reliability, high cost, low efficiency and environmental impact.

Reliability and cost problems arise from the oceanic environment, which is corrosive, erosive, laden with encrusting life-forms and which, in extreme weather, is capable of delivering massive mechanical stress.

Costs are high where the design of the wave energy converter (WEC) relies on over-engineering to counter extreme conditions. It is better to have a compliant design that mimics nature's solutions to ocean conditions or to minimize vulnerable elements of the WEC design or to use an adaptive approach where, for example, in extreme weather, the WEC submerges.

Costs are also high if extensive underwater work is required: for example to fix a rigid structure to the seabed. If a structure already exists, for example to support a wind turbine, this can be exploited. Structural costs can be reduced by using slack tethering to anchors on the seabed.

Low efficiency arises especially from non-resonant coupling between the WEC and the wave. In the worst case, the WEC and the wave are out of phase and energy is subtracted rather than added so that the instant efficiency is negative. Out of phase behavior is guaranteed where the waves are stochastic. Such waves occur in regions of sea that are (a) sheltered from the major oceans so that waves are mainly driven by local winds (b) in shallow waters where sea-bed reflection and refraction confuses the wave pattern (c) close to shore where reflection, diffraction and refraction also confuse the wave pattern. The distorting effects of seabed and shoreline are increased by irregular geometry. Distortion of wave motion by the seabed is almost zero where the sea depth is greater than half the wavelength. The typical peak of the annual ocean swell energy spectrum is 8-10 seconds period. This corresponds to a half wavelength of around 50-80 meters. Therefore an efficient WEC will be located in ocean that is at least 40 m deep and usually at least 1 km offshore.

An efficient WEC must be located in a region where there are strong persistent swells: in brief, offshore from a good surfing beach. Useful swells arise from prolonged central Atlantic and Pacific ocean storms of the kind generated by the Coriolis effect midway between the equator and the poles. Storm waves generated in mid-ocean decompose into persistent swell trains each of uniform period. Since long-period swells travel faster than short-period swells, the swell trains separate. Such trains are capable of traveling thousands of miles with minor energy loss. By using satellite synthetic aperture radar, swells can be tracked and arrival can be predicted many days ahead.

An efficient WEC will also be oriented to the dominant swell. This can be done in three ways: (a) by fixing the WEC in a zone where the dominant swell has a persistent direction (b) by using an omnidirectional device (c) making the WEC self-aligning.

Exposure to persistent energetic swells is a necessary but insufficient condition for an efficient WEC. It is also necessary for the WEC to be dynamically tunable over a wide range, where wide range means the range of periods that characterizes energetic ocean swell: around 5 to 15 seconds.

Dynamic tuning means tuning during operation and tuning rapidly between different swell periods. The required speed of tuning depends on the duration of swell trains, the variability of swell period, the predictability of swell period, the cost of tuning delay and the cost of tuning. The duration of swell trains depends on the duration of the storms that cause them: for example, around 70% of Atlantic tropical storms last more than two days (an average over the last 50 years).

Shifts of swell period tend to be in steps of only one to two seconds. Preferably it should be possible to shift the period of the WEC by one second within two minutes. Depending on all the factors mentioned, the preferable one-second tuning time for a specific configuration of WEC in a specific location may be between 10 seconds and 10 minutes.

Dynamic tuning is useful not only to achieve high efficiency but also to protect the WEC. When the amplitude of oscillation becomes excessive in extreme seas, the WEC can be quickly detuned.

Low efficiency can also result from single-vector energy capture. The water particles of a wave move orbitally, carrying energy in two vectors: vertical and horizontal. A heaving (or bobbing) WEC can capture only the vertical vector; a surging WEC can capture only the horizontal vector. Such devices have a maximum efficiency of 50%. Two-vector energy capture ie pitching offers a wave-to-WEC energy transfer that is up to 100% efficient. Despite the apparent advantage of the pitching vector, heaving and surging WECs represent the majority of WECs offered (in 2012) by wave energy companies. This bias may reflect a belief that heaving and surging WECs offer lower life-cycle costs.

For efficient capture of wave energy the WEC should engage with the swell at or near the ocean surface. At periods that characterize energetic swell, the available swell energy falls by around 2% for every meter of depth. Preferably the WEC should engage the swell within the top 10 meters.

Lastly, a successful WEC must be environmentally acceptable. This tends to limit the application of designs that are either on-shore or near-shore since there are few such locations near to any population centers where a large-scale installation would be tolerated.

Difficulty of Wide Range Dynamic Tuning

Although large WEC efficiency improvements are possible using resonant energy transfer, there has been little progress in achieving this. The equation for the period of an oscillating floating body helps to explain why:

$$T_B = 2\pi \sqrt{((I_M + I_A)/I_C)} \qquad 1.$$

Where:

$T_B$ is the period of the body in seconds.

$I_M$ is the mass moment of inertia (MOI) in the direction of oscillation.

$I_A$ is the added mass MOI of the body in the direction of oscillation.

$I_C$ is the moment of the coefficient of restoring force.

Note:

Added mass is the inertia of fluid displaced by a body that is accelerating or decelerating. For example, a flat-bottomed vessel in pitching motion displaces a relatively large volume of water ie the added mass is large. For the same enclosed volume, a V-shaped body in motion displaces a smaller volume of water ie the added mass is small.

The restoring force is the net buoyancy. The coefficient is the rate of restoring force. It is proportional to the water-plane area For $T_B$ to vary by 3×, the bracketed function on the right of equation 1 must vary by 9×. At first sight, the solution is obvious: for any given value of $I_M$ and $I_A$, simply vary $I_C$. For example, if we steadily submerge a heaving vessel with a conical top, then the water-plane area will steadily diminish and $T_B$ will rise. However, the power from the WEC varies with restoring force, stroke length and period. By reducing $I_C$, the power capacity is also reduced. In specific conditions that are included in the present invention, this problem can be overcome. But generally, we want $I_C$ to be fixed and we must vary $I_M+I_A$.

For $I_M+I_A$ to vary by 9×, either:

One of these terms is very small and the other term can vary by 9×, or

Both terms can vary by 9×

It is easy to show that if either term is fixed and not small, or if either term has a fixed component that is not small, then the required variation in the other term can be much larger than 9×.

If we consider a heaving body, then equation 1 simplifies to:

$$T_B = 2\pi\sqrt{((M+M_A)/C)}, \text{ where:} \qquad 2.$$

M is the mass $M_A$ is the added mass

C=A×d×g where A is the water-plane area, d is the density of seawater and g is the gravitational constant.

If, say, the body is a simple upright cylinder, then $T_B$ cannot be varied by 3×, due to the significant fixed value of $M_A$. If $M_A$ is reduced by streamlining, we may need a 10× variation in M.

An obvious method of varying M is to pump seawater into the cylinder. The amount required for a 10× variation in $T_B$ depends on the value of M when $T_B$=5 seconds.

For example, if the cylinder has a diameter of 5 m, then A=19.6 m² and from equation 2, approximately:

$$2\pi\sqrt{((M)/19.6 \text{ g})} = 5$$

M=123 tonnes, equivalent to a draft of around 6 m

To raise $T_B$ to 15 seconds requires increasing this mass by 10×: on average pumping 123 tonnes of water for every second of change in $T_B$. This is operationally costly and slow.

The present invention shows how to achieve wide-range dynamic tuning without (a) sacrificing power output and (b) at low operational cost and high speed.

PRIOR ART

Prior art lacks descriptions of WECs that are dynamically tunable to resonance with ocean swell and tunable over a wide range of swell periods.

McCabe (U.S. Pat. No. 5,132,550 1992) describes two pontoons on either side of a damped, high inertia float, with the pontoons hinged to the float. Energy is captured from the relative motion of the pontoons and the float, using water pumps. The pontoons can be tuned by 'adjustable ballast' although the exact method is not specified. The pontoons are flat-bottomed, creating a large invariant added mass MOI that makes wide-range tuning impossible.

McCormick (US Pat App 2009/0084296) describes three linked floats aligned with each other and with the ocean swell. The linkages are hinges and pumps are mounted over the hinges. The length of the system is selected to be resonant with the average wave period. Tuning around this period uses U-tubes filled with water. The floats are shown as flat-bottomed, creating a large invariant added mass MOI that makes wide-range tuning impossible.

Beane (U.S. Pat. No. 7,755,224 2010) describes a tunable pitching WEC that meets some of the listed requirements. But Beane does not consider the effect of added mass. He describes a flat-bottomed vessel that is tuned by a solid mass moving along a keel.

Laz et al (U.S. Pat. No. 8,198,745 2012) describes a rolling WEC in which a tunable pendulum is mounted on a tunable raft. The pendulum is of conventional design and therefore cannot be tuned to long periods without an impractically large superstructure. The raft is tuned by extending or retracting flotation tanks that are mounted on its sides and by pumping seawater in and out of the tanks. The raft and tanks are shown as flat-bottomed. Again the large invariant added mass MOI makes wide range tuning impossible.

In the cases listed above, the resonant period is dominated by a large fixed mass MOI and a large fixed added mass MOI and it is not possible to tune dynamically to the range of periods that characterize energetic ocean swells.

Raftery (U.S. Pat. No. 8,093,736 2012) describes a pitching WEC that is dynamically tuned by adjusting the tension of lines tethering a submerged platform and of a cable tethering a floating vessel to the platform. As the vessel rises, the cable is pulled and drives a hydraulic pump. As the vessel falls, stored hydraulic energy is used to reel the cable in. The same system is used for tuning, power take off and the recovery stroke. Applying equation 1 we find that all the terms vary continuously as the cable length changes:

$I_M$: the radius of motion of the vessel changes.

$I_A$: additionally the drag area changes $I_C$: additionally the water-plane area changes.

Variation in cable length is a function of wave height, which is independent of swell period. The implication is that when wave height is varying, tuning to the swell period may be difficult or impossible.

Gregory (US Patent Application 2011/0089689) describes a dynamically tunable pitching WEC capable of tuning over a wide range. The WEC achieves robustness by using the relative motion of the body and an internal compact pendulum, and so avoiding external moving parts. The mass MOI is varied by changing the distribution of solid ballast and seawater ballast. The added mass MOI is varied by varying the draft of a body bottom that tapers from flat at each end to V-shaped in the middle.

A drawback of Gregory's method is that it relies for tuning on variation in draft, which is achieved by pumping large volumes of seawater.

SUMMARY OF THE INVENTION

A WEC is made dynamically tunable to the range of periods that characterize energetic ocean swell by:

Arranging the fixed mass MOI to be low.

Arranging the variable mass MOI to be variable over a wide range.

Arranging the fixed added mass MOI to be low.

Arranging the variable added mass MOI to be variable over a wide range.

In the case of a surging body, forcibly varying the water-plane area

In the case of a pitching body, avoiding wave-bridging

Additionally, to maximize efficiency, the WEC aligns with the dominant swell.

Low fixed mass MOI

Referring to equation 1:

$I_M$ has a fixed component: for example, the MOI of the fixed mass of the floating body and, for tuning purposes also has a variable component: for example the MOI of pumped seawater ballast. To enable the widest range of tuning, the fixed component of mass MOI should be small and the variable component should be widely variable.

The fixed component of $I_M$ is small if the fixed mass of the body is low. The fixed mass is significant for a rotating body (a pitching body or a heaving or surging body constrained to rotate) where a significant portion of fixed mass is remote from the center of rotation. The fixed mass can be of less significance in the case of pure heave or pure surge. The desired tuning range is 5 to 15 seconds: the low end of this range can require a body in pure heave or pure surge to have a large mass. Therefore, it can be satisfactory to build a pure heaving or pure surging body in, for example, steel or reinforced concrete.

The fixed mass of a floating body is reduced if:

The body is made of material having a high specific strength (ratio of strength to weight). Fiber-reinforced polymer (FRP) can be used. Glass-epoxy FRP has a specific strength that is 2× medium carbon structural steel (AISI 1045) and is comparable with high-tensile aluminum alloy (2045 T4). Such aluminum alloys can also be used. Kevlar-epoxy FRP has a specific strength that is around 11× structural steel. The specific strength factor for carbon-epoxy is 15×. By orienting the fibers in the polymer it is possible to construct structures with extra strength in a required direction. Stiffness can be increased by combining layers with different fiber orientation.

A sandwich construction is used. A typical sandwich comprises two thin stiff strong sheets separated by a rigid honeycomb or a rigid corrugated sheet or a solid foam. Steel sandwich panels have been shown to save 50% of weight compared with standard steel construction. A sandwich construction can be combined with the use of FRP or aluminum alloy.

Stressed-skin structure is used. A high ratio of strength to weight is a necessity in aircraft and therefore design methods have evolved to deliver this result. The methods of design of wings and fuselage are relevant. A typical wing comprises an upper and lower shell of sandwich construction fixed to an inner frame comprising spars and ribs. The outer-shell is load-bearing. The structure of bird bones also provides guidance to suitable design. Bird bones, which have evolved to maximize the strength to weight ratio, are hollow, with a thin outer layer and, in the larger bones, internal struts that merge with a cellular structure at stress points. In the case of a wing-like body (see next section: LAM blades) a suitable structure comprises a tubular spar through which a dense tuning mass is moved, and ribs fixed to this spar that support a sandwich shell. In the case of a pod-like body (see next section: LAM pods), a suitable construction is a sandwich shell braced by internal struts.

Space-frame structure is used: this is a high strength to weight ratio structure, typically using repeating tetrahedral trusses.

The mass of WEC parts fixed inside the floating body is kept as low as possible. For example, the power capture and conversion and storage system is kept, where possible, elsewhere: for example on an adjacent non-moving body.

Where $I_M$ is rotational, the need for reduction in fixed mass varies with the square of the distance from the axis of rotation. A hybrid construction is possible, in which the near-axis portion of the floating body is, for example, a conventional steel construction and the tips of the body are made of advanced composite.

Where a floating body is tuned by moving a mass along a rotating arm, it is also an advantage for the arm to have a high strength to weight ratio. Therefore the same methods listed above also apply to the arm.

A structure that uses some or all of these methods to reduce the fixed mass MOI is called here a LM (low mass) structure.

Variable Mass MOI

The variable component of $I_M$ in the case of simple linear oscillation (for example, a heaving WEC) appears at first sight to be limited to seawater ballast that is pumped in and out of the floating body. However, $I_M$ can be varied without pumping seawater by locking and unlocking external masses to the body. In an example, a rigid vertical spar is fixed to the bottom of the floating body. Below the body and sliding on the spar is a neutrally buoyant annular mass. A mechanism inside the annular mass provides a variable friction grip between rod and spar. By activating this mechanism, the annular mass becomes coupled to the body. More then one annular mass can be placed one above the other on the spar. Stacked masses allow the tuning range to be extended. In a variant of this method, annular masses are a stack of sleeves around the floating body.

This method can be generalized to any variably compliant coupling between an oscillating floating body and neutrally buoyant masses. For example, a neutrally buoyant annular mass encircles a heaving floating body and is coupled to the body by variably compliant attachments:

Cables. When these are loose, the body moves freely inside the annulus. When these are tight, the body and the annulus are fully coupled.

Hinged arms. The motion of the arms is constrained by hydraulic pistons and, by turning a valve in a hydraulic circuit, the resistance of the pistons is varied. When the valve is fully off, the arms are locked in place and the body and the annulus are fully coupled.

Where the floating body is rotating, the mass MOI can be varied by changing the radius of a movable mass about the axis of rotation. By using an LM structure, by using a dense movable mass and by using a long arm it is possible to achieve a variation in mass MOI of 9×. In effect the radius of gyration is changed by 3×. The method of moving the mass should avoid fixed mass MOI. For example, the mass can be moved along a toothed track by an electric engine mounted on the mass. In another example, the mass is moved along a rail by a cable and the driving engine is located close to the axis of rotation.

An obvious application is to a tune a pitching floating body. But it is also possible to convert a surging or heaving body to rotation and so use a varying radius of gyration to tune the floating body. For example:

A heaving body is attached to a LM arm. The arm rotates on an axis fixed on a fixed or pseudo-stationary platform. A dense mass is moved along the arm to and from the axis. The arm can extend beyond the heaving body.

A surging body is fixed to a LM arm. The arm rotates on a fixed axis. A dense mass is moved along the arm to and from the axis. The arm can extend beyond the surging body.

Low Fixed Added Mass MOI

Referring to equation 1:

$I_A$ has a fixed component and, for tuning purposes also has a variable component. To enable the widest range of tuning, the fixed component of added mass MOI should be small and the variable component should be widely variable.

The fixed component of $I_A$ is small if the fixed added mass of the floating body is low.

The fixed added mass of a pitching body can be negligible if the body has a fixed radius or radii about the pitching axis. Possible geometries include a sphere, a cylinder, a disc, a pair of cones joined at the base or compound shapes comprising constant radius elements. Only the submerged section of the body requires this geometry.

Fixed added mass is small if the body is streamlined. Low added mass for a given body volume is achieved by an ellipsoid cross-section in the direction of motion through the water and the fineness ratio, FR (ratio of maximum width to length) is between 3 and 7 and ideally 4.5. The reduction in added mass compared with a blunt profile is as much as 94%. A variation on this shape is a lenticular (double convex lens shape) cross-section. Such an ellipsoid or lenticular cross-section is called here a low added mass (LAM) profile. A beam-shaped body with a LAM profile aligned to the direction of motion is called here a LAM blade. A rotated LAM profile can be described as spindle-shaped or fusiform. A fusiform body aligned to the direction of motion is called here a LAM pod.

Low added mass requires less energy to accelerate a body through water. It follows that low added mass geometry has evolved in aquatic animals, especially oceanic animals that rely on speed and acceleration for predation.

Most fish have FRs between 3 and 7. Swordfish (average FR=4.2) are among the fastest fish, with underwater burst speeds up to 60 kph. Great white sharks (average FR=5) have burst speeds up to 40 kph. Pinnipeds (members of the seal family) have FR in the range 3 to 6. The fastest pinniped, the Steller sea lion (average FR=5.5). can reach 40 kph. Cetaceans (whales and dolphins) have FRs in the range 3 to 11. The fastest cetacean is the killer whale (average FR=4.3) with a top sprint speed underwater of 55 kph.

Low added mass in a pitching body can be achieved by combining constant-radii geometries with LAM blades. For example, a pitching cylinder can have LAM blades fore and aft. Low added mass in a heaving or surging body can be achieved with LAM blades or LAM pods.

Another way to achieve low added mass is to keep moving structures out of the water. For example, a pitching cylinder can have LM arms mounted above it. Dense masses can be moved on these arms and neither masses nor arms incur significant added mass. (Some aquatic animals use the same strategy: leaping or indeed flying out of the sea).

Variable Added Mass MOI

The variable component of $I_A$ in the case of linear oscillation is the added mass created by variation in the external geometry of the floating body. 9× variation in added mass is possible using external fins that are symmetrically mounted on rotatable shafts fixed in the body wall. When these fins are aligned with the direction of motion the added mass effect is small. The fins can be rotated to present a flat face perpendicular to the direction of motion, increasing the added mass and therefore increasing the period of oscillation of the floating body. To increase the effect, the fins can be circular and rotate within the middle of cylindrical enclosures. When the fins are aligned with the direction of motion, the enclosures offer little resistance to flow. When the fins are locked at right angles to the direction of motion, the enclosure acts as an entraining lip, so increasing the added mass. By using long enclosures, water is trapped when the fin is at right angles to the direction of motion. The effect is to increase not only the added mass but also the mass. We can call this inertial trapping. Using sufficiently large enclosures and fins it is possible to quickly vary the total mass by 9×. The apparent price for this is a large amount of energy lost to drag.

But 'inertial trapping' can be achieved without significant drag:

A rigid vertical spar is fixed below a heaving body.

Mounted on this spar is an open vertical tube.

Above this tube and aligned with it is a LAM pod also mounted on the spar and with an external diameter slightly smaller than the inside diameter of the tube.

The separation between pod and tube allows water to flow freely around the pod and through the tube. There is little drag.

By bringing the pod and tube together, the end of the tube is blocked, so trapping the inertia of the water contained in the tube. But the pod provides streamlining and so there is still little drag.

A LAM pod below the tube is used in the same way.

We can call this LM inertial trapping.

Variable angle fins can be mounted on heaving, surging or pitching bodies. Such fins can have a strong effect on rotating bodies: by placing the fins at an extreme radius from the axis of rotation, the added mass MOI can be widely varied. The trade-off is that the fin assembly represents a significant fixed mass MOI. The fin assembly should be as light as possible. For example, the fins can be actuated by compressed air, using a compression source that is close to the axis of rotation.

Other methods of varying the added mass include:

Retracting fins mounted in sockets in the exterior wall of the floating body. The fins slide in the sockets, being driven by, for example, double acting compressed air pistons. When retracted, the fin ends are level with the exterior surface of the body. When extended, the fins increase the added mass. The extension can be variable. Other geometries can be used.

Adding external added mass to the body. For example, a heaving floating body can have a variably compliant attachment to a neutrally buoyant annular mass. The annular mass has a lipped horizontal skirt that creates significant added mass. When the attachment is loose, the annular mass has no influence on $I_A$. When the attachment tightens, $I_A$ rises (and $T_B$ increases). We can call this variable compliance tuning.

In other examples of variable compliance tuning:

A heaving body has hinged fins fixed symmetrically to its circumference. The hinges are fixed to the body and allow the fins to rotate through (substantially) 180 degrees. At 90 degrees, the fins are horizontal ie perpendicular to the heaving motion. When fully compliant, the fins rest flat against the body as the body moves. When the body reverses direction, the fins rotate and flatten against the body in the opposite direction. The added mass effect is small. By inflating air bags on each side of each fin, the fins are prevented from flattening against the body at each reversal of motion and so the added mass rises. When the bags are fully inflated, the fins are held at 90 degrees and the increase in added mass is at a maximum.

A pitching LAM blade has a pair of flexible fins fixed symmetrically to it at the fore and at the aft. The fins have a horizontal surface. For example, the fins are made of molded neoprene reinforced with steel and/or aramid fibre cord. The fins contain air chambers that can be inflated or deflated. When the chambers are deflated, the fins are compliant and bend with the movement of the LAM pod so that the increase in added mass is small. When the chambers are inflated, the fins are stiff and the increase in added mass is large.

Forcibly Varying the Water-Plane Area

As already discussed, it is easy but counter-productive to tune a floating body by reducing the water-plane area. However, it is not counter-productive to increase the water-plane area. This can be done by pulling the body downwards, for example, using a cable and winch. Since this inhibits vertical motion, this method is limited to surging bodies. Given a sufficiently buoyant body and appropriate geometry, it is possible to increase the water-plane area by 9× and so tune the body from 15 to 5 seconds period.

As examples:
A surging floating body is slidably mounted on arms fixed to the seabed. The arms move in the direction of the surge by sliding or rotating. Power is extracted from this motion. The body is tuned by pulling the body down the arms, using, for example, a cable driven by a highly geared locking winch.

A surging floating body is anchored by a tensioned cable to the seabed. The tension on the cable is varied by a locking winch that is preferably inside the body. The body is omnidirectional ie it has radial symmetry and has a radially symmetrical PTO system. In an example, the PTO system comprises three oscillating shaft generators (OSGs) driven by cables anchored at one end to the seabed and at the other end carrying a counterweight. OSGs are explained later under PTO systems.

Avoiding Wave-Bridging

Wave-bridging limits the dimensions of all WECs. For example, the omnidirectional surging body just described should not have a diameter much greater than the wavelength corresponding to the smallest design value of $T_B$. For $T_B=5$ seconds, the limiting diameter is around 40 m. Above 40 m, the body starts to bridge the peaks of successive swells and at 60 m, motion at $T_B=5$ seconds is suppressed.

The problem of wave-bridging is acute for pitching bodies. Rationally, a pitching body is optimized for the peak annual swell energy: usually For $T_B=8$ to 10 seconds.

The optimum length is between half and one wavelength: for $T_B=10$ seconds this is between 80 m and 160 m. But at 80 m, wave-bridging occurs for values of $T_B$ below 6 seconds.

Solutions to this problem are:
Limiting the length of the pitching body to around 40 m: this will not bridge any swells from 5 to 15 seconds period. The body is tuned over this range of periods by a combination of
LM structure to minimize fixed mass MOI
LAM profile to minimize fixed added mass MOI
Out of water structure to minimize fixed added mass MOI
Moving dense masses to vary the mass MOI
Variable angle fins to vary the added mass MOI
Using gravitational restoring force instead of buoyant restoring force. This avoids the need to immerse buoyant arms and so avoids wave-bridging for any value of $T_B$. The floating body has fixed below it a LM and LAM keel with a mass at the end. The keel mass provides gravitational restoring force. Fixed above the body and out of the water are symmetrical LM arms. The body is tuned by moving dense masses symmetrically on these arms.
Locking and unlocking the links between a series of body segments to modify the effective rigid immersed length of the pitching body. The locking method can be conveniently combined with use of an OSG power take off. The link between segments employs a horizontal shaft that passes through the fore section of an aft segment. The shaft turns on bearings in the wall of the aft segment. Outside the aft segment, the shaft is rigidly connected to a rigid yoke. The yoke rotates in the horizontal plane on a hinge fixed to the aft section of the fore segment. In effect the two segments are joined by a universal joint. An OSG in the aft segment converts the oscillating rotation of the shaft into useful electrical power. The shaft is locked by means of a disc brake: the disc turns on the shaft and is bracketed by brake pads powered, for example, by compressed air. This method is discussed further in the next section.

Other locking methods are possible. For example:
The body segments have opposing faces that are shaped to fit each other. For example, the aft face of the first segment is concave in the shape of a cone and the fore face of the second segment is convex in the shape of a cone. A cable runs from the axis of the concave face to the axis of the convex face. By tightening the cable, the faces are pulled together and the two segments lock.

The aft face of the first segment is flat and the fore face of the second segment is also flat. Mounted on both faces are multiple alternating plates of steel and rubber. A cable runs from the axis of the aft face to the axis of the second face. By tightening the cable, the segments are pulled together, the plates are pressed together and the segments lock.

Wave-Following

A wave-following WEC uses a series of linked floating bodies and extracts power from the relative motion of adjacent bodies. The bodies move in both the heave and surge vectors and therefore are pitching, although the axis of rotation can vary. At maximum power, adjacent bodies are each half a wavelength long and the link between bodies oscillates to maximum amplitude, with the center of each body tending to stay level. Therefore a tunable wave-following WEC can be designed as a series of symmetrical pitching bodies, with a LM and LAM blade construction, dense masses that can be moved symmetrically from the pitching axis and variable angle fins at the extremes of the blade. But LM design is contradicted by the significant fixed mass of the links between bodies and the associated PTO systems. One solution is to move the main mass of the PTO system to the pitching axis. This can be done by using an Oscillating Shaft Generator (OSG) (see next section): the shaft is turned by the link with the adjacent body and a cable runs from the shaft to the OSG power unit at the pitching axis.

The lengths of the bodies of a wave-follower are critical. Ideally all the bodies are the length of half a wave-length at values of $T_B$ from 5 to 15 seconds. In principle, this can be done by using a series of nine bodies that are each 20 m long. The links between the bodies are lockable. When all links are unlocked, all the bodies are at the optimum length for $T_B$=5 seconds. When all the links are locked, the combined length is optimum for $T_B$=15 seconds. Intermediate locking and unlocking provides tuning by length for intermediate values of $T_B$.

But this is an expensive solution since every link requires a PTO. A more practical solution is to use only two or three links while ensuring that there is a linking combination that gives the optimum length for the peak annual energy of the location of the WEC. For example, if the value of $T_B$ that corresponds to the peak energy is 9 seconds then it is desirable to have an option to create a rigid immersed length of around 65 m.

Alignment with the Dominant Swell

Tuning to the dominant swell is not useful unless the floating body is aligned to the swell. Applicable methods of alignment are:

Giving the floating body a fixed orientation where the dominant swell direction varies little: this is sometimes the case for in-shore WECs. The present invention describes two in-shore WECs with fixed orientation Designing the floating body to be omnidirectional by giving it radial symmetry. This is almost automatically true for heaving bodies. The present invention describes a heaving body and also an omnidirectional surging body. In some designs of surging bodies, the only way to achieve radial symmetry is to use multiple surging bodies: for example, arranged (in plan view) as a cross or a square.

Making the body self-aligning. This is unnecessary for heaving bodies, highly problematic for surging bodies and necessary for pitching bodies, including wave-followers. The obvious way to self-align a pitching body is to tether the body from the fore section. This can be combined with use of an OSG as follows:

As already described under wave-following, the OSG (see next section) power unit is placed near the pitching center.

The OSG is driven by a cable that runs to an oscillating horizontal shaft that passes through the interior of the fore section of the body.

Outside the body, both ends of the shaft are fixed to a rigid yoke that passes under the body.

The rigid yoke enables orbital motion of the body by means of connection to a crank arm.

The crank arm comprises two rigid and buoyant sections. The crank sections are joined by a vertically acting hinge. The lower crank section is fixed to a submerged pseudo-stationary platform by a combination of universal joint and horizontal rotary bearing. This configuration provides compliance to roll and yaw and enables the crank arm to swing round as the swell direction changes.

Where the yoke is directly connected to a shaft at the pitching centre, a rigid LM vane is attached to the aft of the pitching body.

Power Take Off (PTO) System

The tuning methods described in the present invention concern tuning a floating body to the dominant swell to improve the efficiency of transfer of energy from energetic swell to floating body. There is also an opportunity to tune the power take off to the floating body. This is a separate topic, not covered here.

For present purposes, the PTO system can be chosen from a wide range of options, including systems that are:

Mechanical: crank, rack and pinion, ratchet wheel and so on.
Hydraulic: involving different fluids, pressures, pumps and motors.
Pneumatic: many kinds of pump.
Electromagnetic: for example, a linear generator.
Piezo electric.

It can be argued that a mechanical system is preferable because it does not involve the contamination and reliability risks of hydraulics or the compression losses of hydraulic and pneumatic systems. It is not an accident that most wind turbines use mechanical drives and that so far wind turbines based on hydraulics have not been a success.

The PTO examples used here are all oscillating shaft generators (OSGs). The OSG takes useful power from an oscillating shaft in the following steps:

A gear wheel rotating on the shaft transfers rotation to a ratchet wheel to achieve one-way motion.
The ratchet wheel rotation is transmitted through a gear chain that greatly increases the velocity of rotation.
High-speed rotation is delivered to a flywheel via an overrunning clutch.
The flywheel delivers smoothed high-speed rotation via a clutch to a rotary electrical generator By arranging a pair of ratchet wheels and a reversing gear, it is possible for both directions of rotation to deliver power to the flywheel. It may be convenient to place the flywheel on the oscillating shaft, rotating freely there.

The OSG is in a water-tight housing and the oscillating shaft is driven by an arm or wheel outside the housing. For example, the oscillating shaft passes through a bearing in the wall of the floating body. Examples are:

An OSG is mounted in a floating body and driven by cable and counterweight. A cable is looped over an external wheel on the shaft of the OSG. One end of the cable is attached to the seabed. The other end is attached to a counterweight. As the floating body oscillates relative to the seabed, the cable spools over the wheel and the shaft oscillates. The same method can be used to capture the relative motion of any two bodies. The OSG can be placed on an external platform and the end of the cable can be attached to the floating body.

An OSG is mounted in a floating body. The OSG shaft is connected rigidly to an arm and the arm is hinged to another stationary or out of phase body. The shaft is again driven by relative motion. In a variant, as already outlined, the oscillating shaft is remote from the rest of the OSG system and connected to it by, for example, a cable. By this means, the main mass of the OSG can be kept near the pitching axis of a pitching body, and, at the same time, the body can be tethered by an oscillating shaft in the fore section of the body.

Control System

Dynamic tuning of a WEC requires a control system. The relevant inputs to the control system include:

Immediate readings of incident swell height, direction and period using, for example, on-board pressure gauges and accelerometers.
Reports of the same data from local monitoring buoys.
Reports of the same data from satellites.

If the expected or actual conditions appear imminently dangerous, the control system takes two steps:

Detuning the vessel to reduce response.
Flooding ballast tanks to submerge or semi-submerge the WEC.

The information on swell period is used to adjust the tuning of the vessel to achieve resonance. The control software acts using predetermined tables of appropriate tuning settings but records the results achieved and continuously modifies the tables.

BRIEF DESCRIPTION OF DRAWINGS

Unless stated otherwise, all figures are schematic and not to scale. In summary the attached figures are:

FIGS. 2a to 2c: a side view of a heaving body that is tuned by locking and unlocking masses.

FIGS. 7a and 7b: side view of LAM inertial trap before and after trapping.

FIG. 8a: front view of a sliding surging blade with tension tuning.

FIG. 8b: side view of the same with cut-away showing cable wheels.

FIG. 8c: plan view of the blade and arms showing sliding arrangement.

FIG. 10a: side view of a rotating LAM blade surging WEC.

FIG. 10b: plan view showing blade cross-section.

FIGS. 10c and 10d: side views showing tuning with movable internal masses.

FIGS. 12a and 12b: side views in cross-section of pitching LAM blades tuned by movable masses.

FIG. 12c: front view in cross-section of LAM blade.

FIGS. 12d and 12e: plan views of pitching LAM blade tuned by variable angle fins.

FIG. 12f: side view of pitching LAM blade showing location of fins.

FIG. 13a: plan view of pitching WEC comprising a cylinder with LAM blades attached.

FIG. 13b: side view of the same showing tethering by crank arm to pseudo-stationary (PS) platform.

FIG. 13c: plan view of PS platform.

DETAILED DESCRIPTION OF PREFERRED EMBODIMENTS

Figure 1:
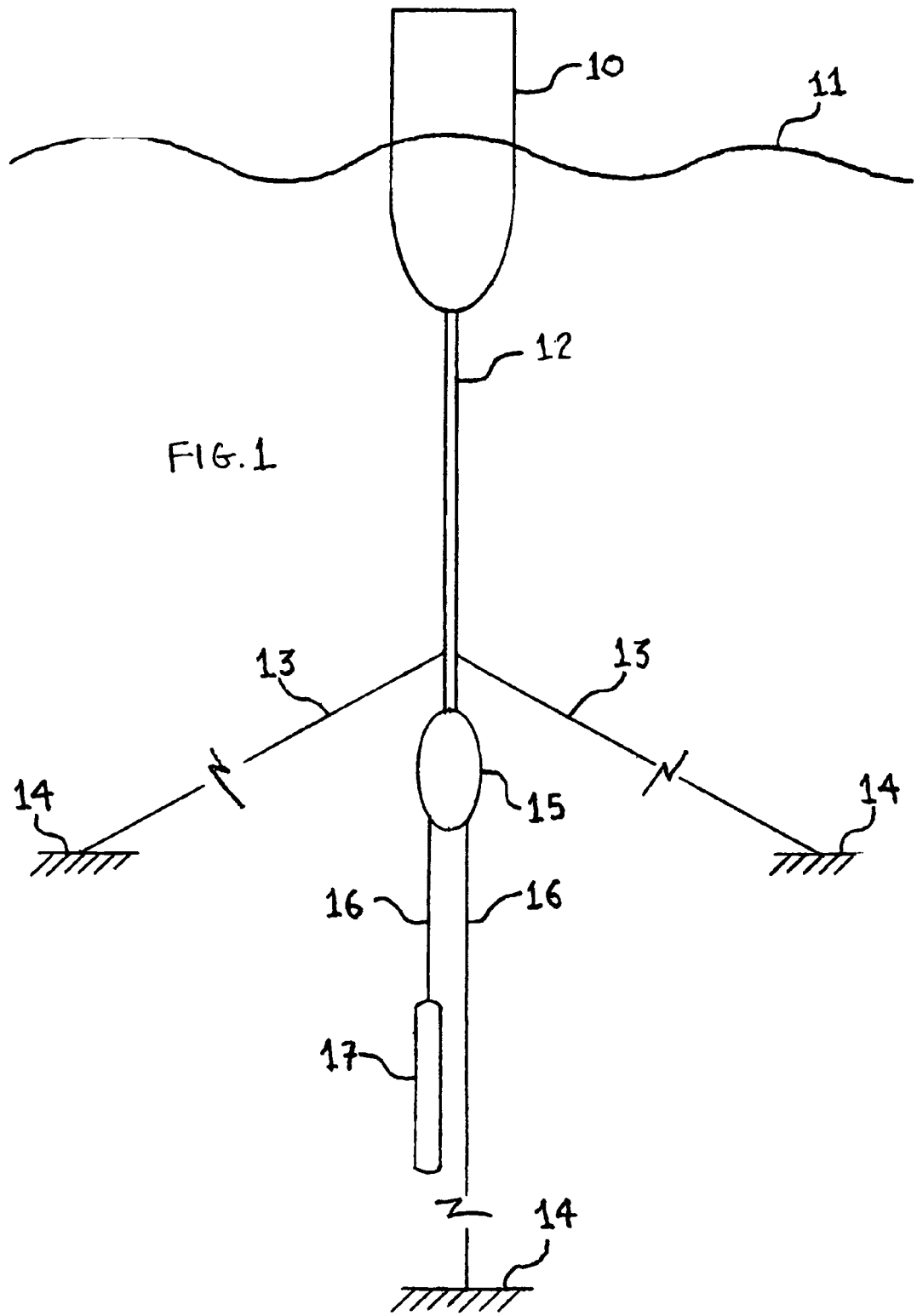
FIG. 1: a side view of a heaving body with oscillating shaft generator (OSG)

FIG. 1: side view of a heaving body with oscillating shaft generator

A LAM heaving body (10) floats in a swell (11). The bottom of the body (10) at the vertical axis is fixed to a rigid vertical rod (12). Connected to the rod (12) are at least three slack mooring lines (two are shown: 13) arranged at equal radial angles (not shown). The lines (13) are fixed to the seabed (14). Fixed to the bottom of the rod (12) is a LAM pod (15) containing an OSG (not shown). The OSG is driven by a cable (16) that loops round a wheel (not shown) on the OSG shaft (not shown). The cable is fixed to the seabed (14) at one end and to a counterweight (17) at the other end.

The mooring arrangement permits the body (10) to heave. As it does so the cable (16) reciprocates and the OSG generates electrical power.

FIGS. 2a to 2c: side views of a heaving body that is tuned by locking and unlocking masses.

FIG. 2a: a LAM heaving body (10) rides substantially above the waterline (20). The bottom of the body (10) at the vertical axis is fixed to a rigid vertical rod (12). Not shown, but fixed to the bottom of the rod (12) (see FIG. 1) is a LAM pod containing an OSG. Not shown, but attached to the rod (12) are slack mooring lines permitting vertical motion of the body (10). Below the body (10) and sliding on the rod (12) are a first lockable mass (21) and a second lockable mass (22). These masses (21 and 22) are shaped as LAM pods. The rod (12) passes through the vertical axis of the lockable masses (21 and 22) and in this instance, the lockable masses (21 and 22) can move freely on the rod (12).

The lockable masses (21 and 22) have neutral buoyancy and by sensing the position on the rod by means not shown, a trimming tank (not shown) in each lockable mass (21 and 22) is used to hold the masses (21 and 22) at a desired depth.

The period of oscillation of the heaving body (10) is a function of total mass plus added mass of the heaving body (10) and its connected parts divided by the water-plane area. Since, by design, the added mass is small and the water-plane area is fixed, the device can be tuned by varying the total mass. In this instance, by design, the period of oscillation is 5 seconds.

FIG. 2b: This is the same WEC as described under FIG. 2a. The first lockable mass (21) is locked on to the rod (12). The increase in total mass is indicated by the greater immersion of the body (10).

In this instance, the first lockable mass has a mass that is 3× the total mass of FIG. 2a. As a result, the total mass is increased 4× and the period of oscillation is increased by 2× to 10 seconds.

FIG. 2c: This is the same WEC as described under FIG. 2a. Both the first lockable mass (21) and the second lockable mass (22) are locked on to the rod (12). The increase in total mass is indicated by the greater immersion of the body (10).

In this instance, the second lockable mass has a mass that is 5× the total mass of FIG. 2a. As a result, the total mass is increased 9× and the period of oscillation is increased 3× to 15 seconds.

In this example, two lockable masses are used and a 10 second period of oscillation is chosen as a midpoint. Efficiency of energy capture is improved if the midpoint is at the peak of the annual wave energy spectrum: this will depend on location. Efficiency is also improved if smaller increments of tuning are allowed. For example, if three lockable masses are used with masses that are 2×, 3×, and 4× the starting total mass, then the possible steps in total mass are:
1+2=3
1+3=4
1+4=5
1+2+3=6
1+2+4=7
1+3+4=8
1+2+3+4=10

Finer tuning is possible between increments by varying the added mass. Added mass is not a preferred means of achieving major tuning increments because the price of increased added mass is increased losses of energy to drag. Tuning by means of variable added mass is shown in FIGS. 5 and 6.

The lockable masses (21, 22) are preferably the least expensive masses that can be easily formed into the shape of a LAM pod. At the same time, there should be easy access to the interior. A possible solution is to cast the pod in reinforced concrete in two halves (split along the long axis); these halves are then bolted together.

Maintenance can be carried out by attaching the halves to floats, unbolting the halves and removing them.

FIGS. 3a to 3d: examples of LAM profiles shown to scale.

Figure 3A:
FIGS. 3a to 3d: examples of LAM profiles shown to scale.

FIG. 3a shows the cross-section of a lenticular LAM blade body with a fineness ratio (FR) of 3. This body has low added mass in the direction of the long axis. Added mass increases rapidly as the FR is reduced below 3.

Figure 3B:
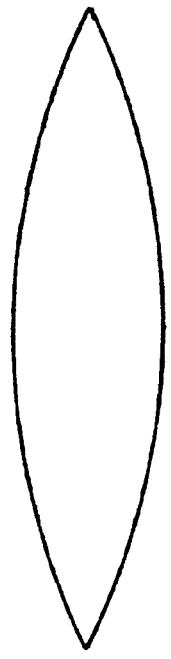

FIG. 3b shows the cross-section of a lenticular LAM blade body with a fineness ratio (FR) of 4.5. This body has the lowest added mass for a given contained volume.

Figure 3C:
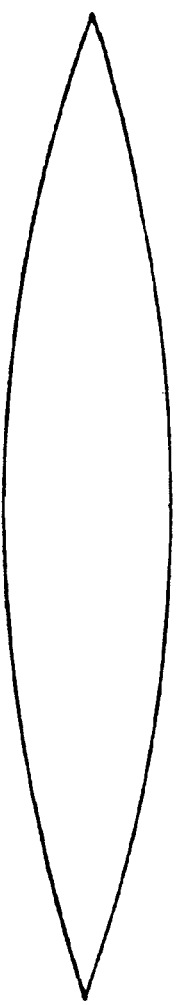

FIG. 3c shows the cross-section of a lenticular LAM blade body with a fineness ratio (FR) of 7. This body has low added mass. Added mass increases significantly as the FR is raised above 7.

Figure 3D:
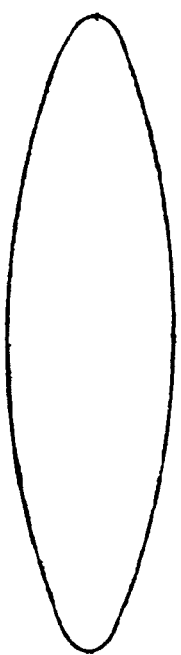

FIG. 3d shows the cross-section of an ellipsoid LAM blade body with a fineness ratio (FR) of 4.5. This is an alternative to the lenticular shape.

The cross-section of a LAM pod body is the same as shown in FIGS. 3a to 3d: if a LAM cross-section is spun on its long axis, then the shape that is traced out is a LAM pod. If a LAM cross-section is spun on its short axis, then the shape that is traced out is a LAM disc.

Figure 4A:
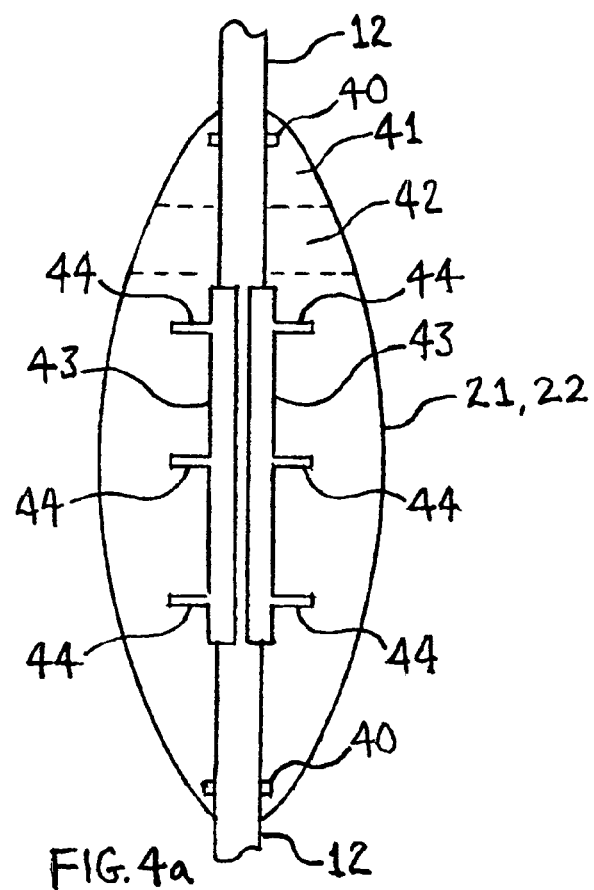
FIG. 4a: a side view in cross-section of the mass locking mechanism.

FIG. 4a: side view in cross-section of the mass locking mechanism.

The rod (12) passes through the long axis of the lockable mass (21, 22), which has a LAM pod profile. Fixed inside the mass (21,22) at each end and abutting the rod (12) is an annular coil (40) that detects the relative motion of magnets (not shown) embedded in the rod (12). Fixed inside the mass (21,22) at the top are a trimming system (41) and a control system (42). The trimming system (41) comprises elements that are not shown and include: seawater ballast tank, electric air compressor, air reservoir, connecting piping and valves. Air is supplied through a flexible tube from a snorkel floating on the sea surface. Electricity is supplied via a flexible cable from batteries inside the heaving body (10). The control system (42) (detail not shown) acts on input current from the annular coils (40) to either admit seawater into the ballast tank or to blow water out with compressed air. The control system (42) also accepts commands from a system (not shown) in the heaving body that monitors swell period and height and also receives remote commands. As the swell period changes, the control system (42) can cause locking and unlocking of the mass (21,22) to the rod (12).

Wrapped round the rod (12) are two rigid brake pads in the form of a split cylinder (43). The pads (43) are fixed to rigid pins (44) that slide inside slots (45) (shown in FIG. 4b).

Figure 4B:
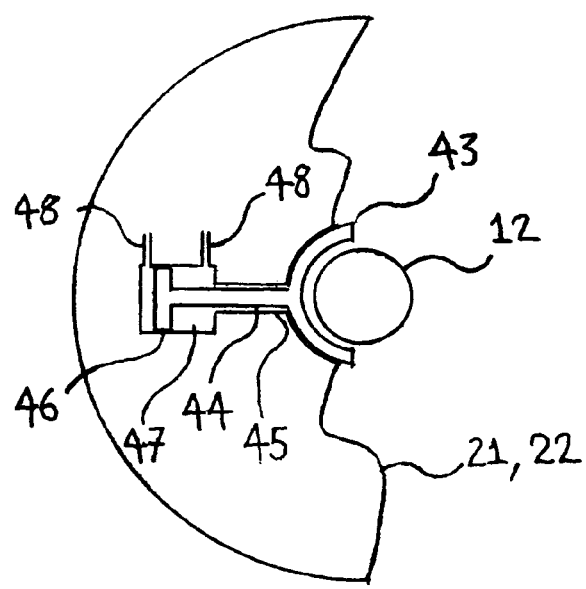
FIG. 4b: a plan view in cross-section of half of the mechanism.

FIG. 4b: plan view in cross-section of half of the locking mechanism.

A single brake pad (43) is shown retracted from the rod (12). A supporting pin (44) is shown inside a slot (45). The pin is connected to a double-acting piston (46) that slides on seals (not shown) inside a chamber (47). Compressed air lines (48) are connected to the chamber (47) on each side of the piston (46). The control system (42) operates valves (not shown) in the air lines (48) to admit high-pressure air or to release air, so operating the brake.

Compressed air brake technology is well understood and is currently used, for example, in commercial road vehicles of up to 7000 kg weight.

Figure 5A:
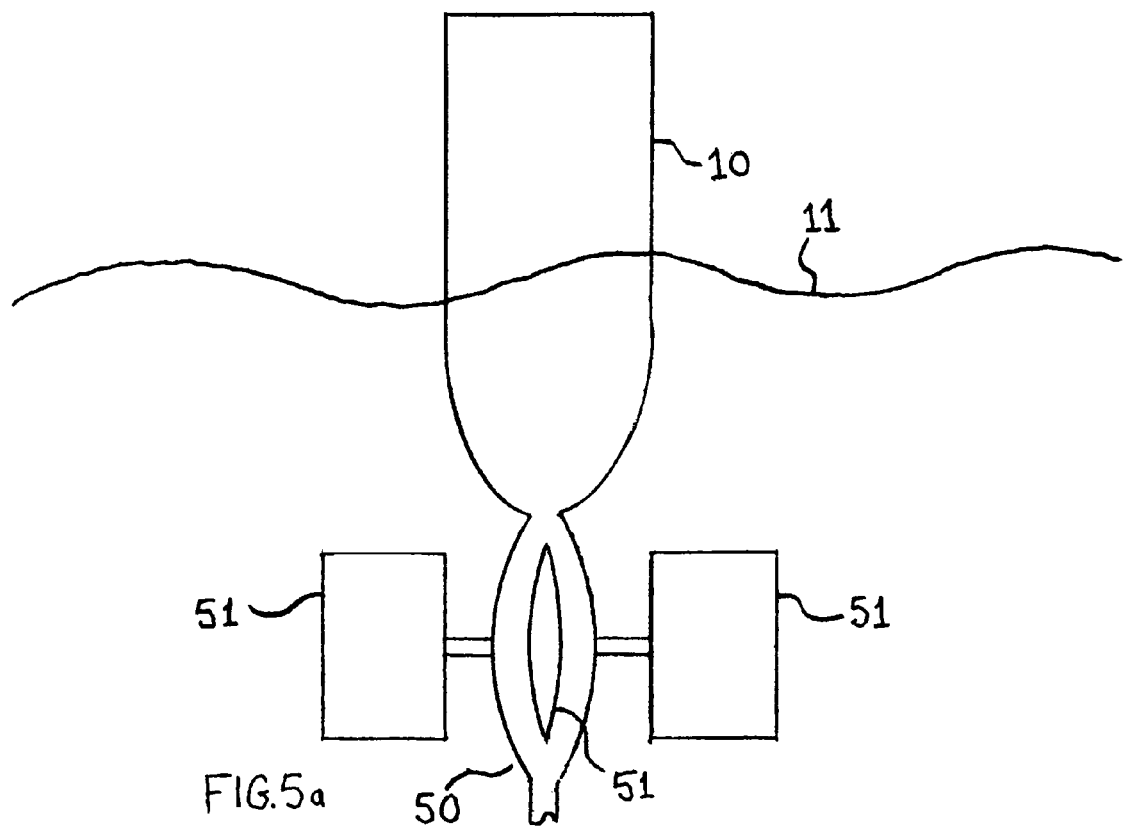
FIG. 5a: a side view of a heaving body with variable angle fins in the low added mass position.

FIG. 5a: side view of a heaving body with variable angle fins in the low added mass position.

A heaving body (10) floats in a swell (11). Fixed below the body (10) is a LAM pod (50) containing actuators (not shown) that control the angle of four fins (51) with a LAM profile. In this instance the fins (51) are vertical so that the added mass effect on the heaving system is very small.

Figure 5B:
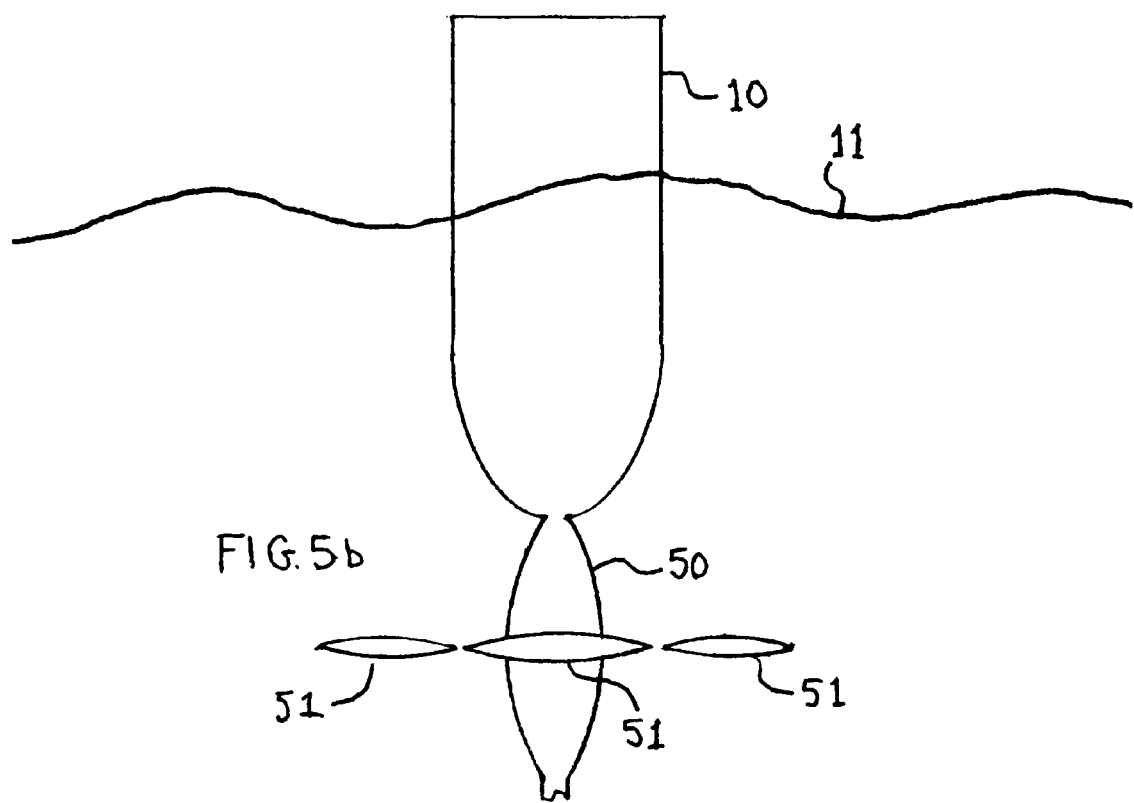
FIG. 5b: a side view of a heaving body with variable angle fins in the high added mass position.

FIG. 5b: side view of a heaving body with variable angle fins in the high added mass position.

This is the same system as shown in FIG. 5a. In this instance the fins (51) are horizontal so that the added mass effect on the heaving system is large. By varying the angle of the fins (51), added mass can be continuously and quickly varied.

It is necessary to have (at least) four fins (51) equally spaced about the vertical axis of the actuator pod (50). By simultaneously rotating adjacent fins (51) in opposite directions, a net twisting force is avoided.

The actuators can be powered by electricity or by compressed air, both of which are available for controlling the lockable masses (21, 22).

FIGS. 6a to 6f: a side view in cross-section of variable angle fins in different positions and in different enclosures.

Figures 6A, 6B:
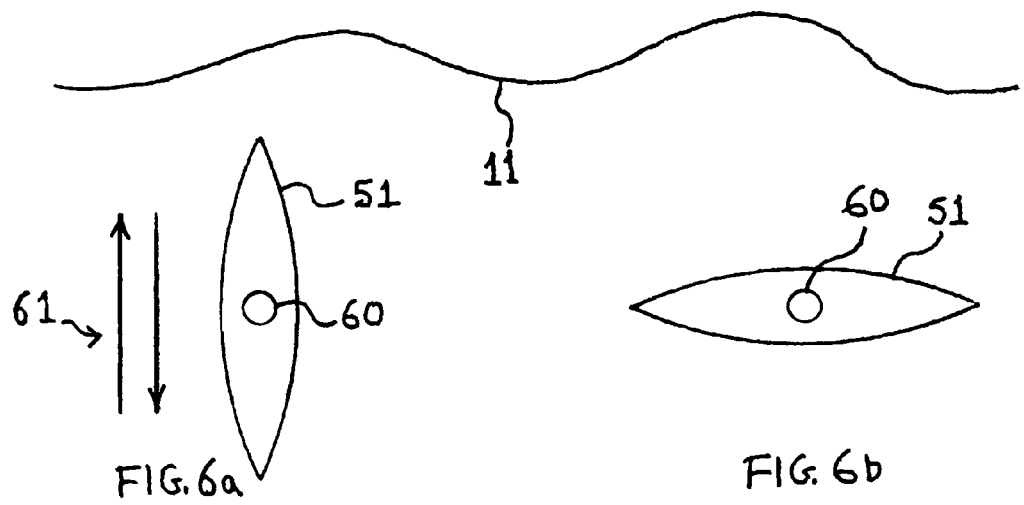
FIGS. 6a to 6f: a side view in cross-section of variable angle fins in different positions and in different enclosures.

FIG. 6a shows a simple LAM fin (51) rotating on a shaft (60). The arrows (61) indicate heaving motion as a result of the swell (11). The fin (51) is in the low added mass position.

FIG. 6b shows a simple LAM fin (51) rotating on a shaft (60). The fin (51) is in the high added mass position.

Figures 6C, 6D:
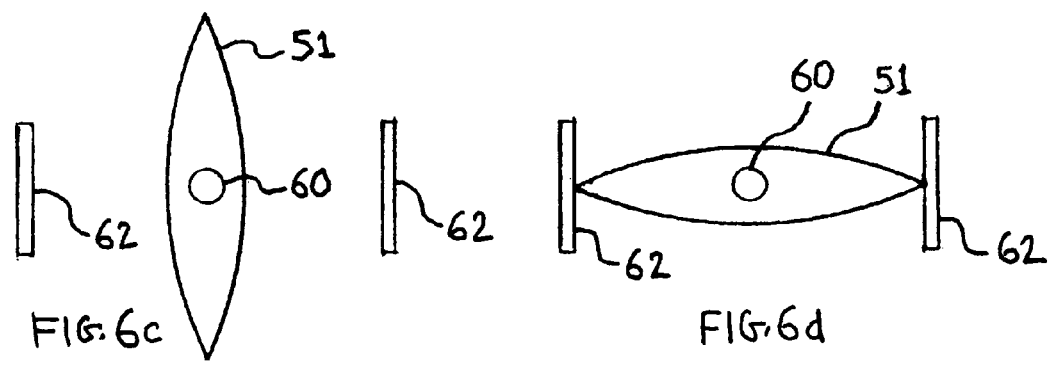

FIG. 6c shows a LAM fin (51) rotating inside a short enclosure with thin straight walls (62). If the enclosure (62) is tubular then the fin (51) must be circular. The overall added mass is low.

FIG. 6d shows a LAM fin (51) inside the short enclosure (62) in the high added mass position. The effect of the enclosure (62) is to increase the added mass.

Figures 6E, 6F:
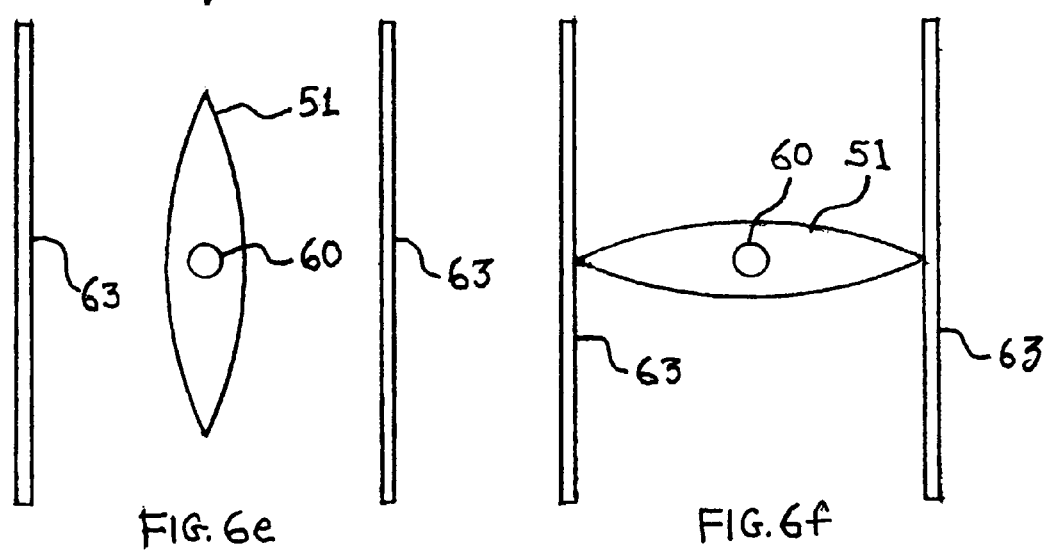

FIG. 6e shows a LAM fin (51) rotating inside a long enclosure (63) with thin straight walls. The overall added mass is low.

FIG. 6f shows a LAM fin (51) inside the long enclosure (63) in the high added mass position. The added mass is increased and also there is significant trapping of mass.

It can be seen that by placing the fin in an enclosure, the inertial effect on the period of oscillation of a body can be increased.

FIG. 7a: side cross-section view of LAM inertial trap before trapping.

A vertical rod (70) is fixed to the base of a heaving body (not shown). Fixed on the rod (70) using struts (71) and forming an annulus around it is a thin-walled LM open tube (72). A first LM and LAM pod (73) rides on the rod (70) above the tube (72) and at a distance that does not impede the free flow of water through the tube (72). Likewise a second LAM pod (74) rides on the rod (70) below the tube. The arrangement causes very little drag.

FIG. 7b: side cross-section view of LAM inertial trap after trapping.

The pods (73, 74) are moved to the tube (72) and close it at both ends, so trapping the inertial mass of the contained water. The ends of the pods (73, 74) provide streamlining and so drag remains low.

As an example, the pods (73,74) are neutrally buoyant and each is moved by a small electric motor (not shown) that drives friction wheels (not shown) on the rod (70).

Use of LAM inertial traps is an alternative to the use of locking/unlocking masses to control total mass.

FIG. 8a: front view of a sliding surging blade with tension tuning.

A rigid LAM blade (80) is held between two rigid vertical arms (81) and at the top of the arms (81). The blade (80) and the arms (81) are buoyant. The arms (81) project above the waterline, indicated by the swell (11). The blade (80) is partly immersed. The arms (81) are arranged so that the blade (80) is at right angles to the direction of swell. (This is an inshore device located so that the direction of the swell varies only slightly). The arms (81) are fixed at the base to an upper shaft (82) held in bearings (not shown) that are fixed in the foundations (83). Fixed to the upper shaft (82) and rotating with it is a central power wheel (84) around which a power-transmitting cable (85) is wrapped. Also held in bearings (not shown) fixed in the foundations (83) is a lower shaft (86). Fixed to the lower shaft (86) and rotating with it are two position wheels (87): one under each arm (81). Wrapped round each position wheel (87) are position cables (88). These cables (88) run up slots (not shown) in the arms (81) and are fixed to the ends of the blade (80). The foundations (83) are fixed to the seabed (14).

FIG. 8b: side view of the same with cut-away showing cable wheels.

The arrows (89) indicate surge direction. The blade (80) is tilted with respect to the arms (81). The raised face of the blade (80) faces the incoming surge. The cutaway shows the power wheel (84) and the power-transmitting cable (85). Also shown are a position wheel (87) and a position cable (88).

FIG. 8c: plan view of the blade and arms showing sliding arrangement.

The blade (80) has rails (810) that slide up and down in slots (811) in the arms (81). The arms (81) are streamlined in the direction of surge. The position of the blade (80) in the slots (811) is determined by the position cables (88), that run up the slots (811) and are fixed to the ends of the blade (80) (not visible in this view).

Figure 9A:
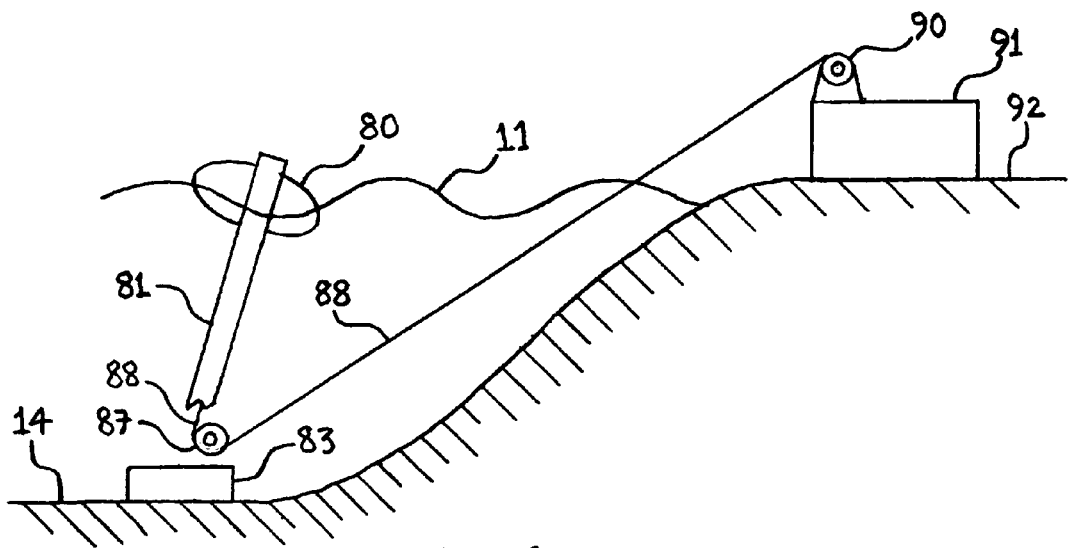
FIG. 9a: side view of sliding surging WEC with cutaway showing tension cable connected to an on-shore winch.

FIG. 9a: side view of sliding surging WEC with cutaway showing position cable connected to an on-shore winch.

A position cable (88) is shown running from an arm (81), round a position wheel (87) and up to a winch (90) mounted on a housing (91) fixed to the shore (92).

There are two position cables (88). These are joined by a yoke (not shown) so that a single cable is operated by the winch (90).

Figure 9B:
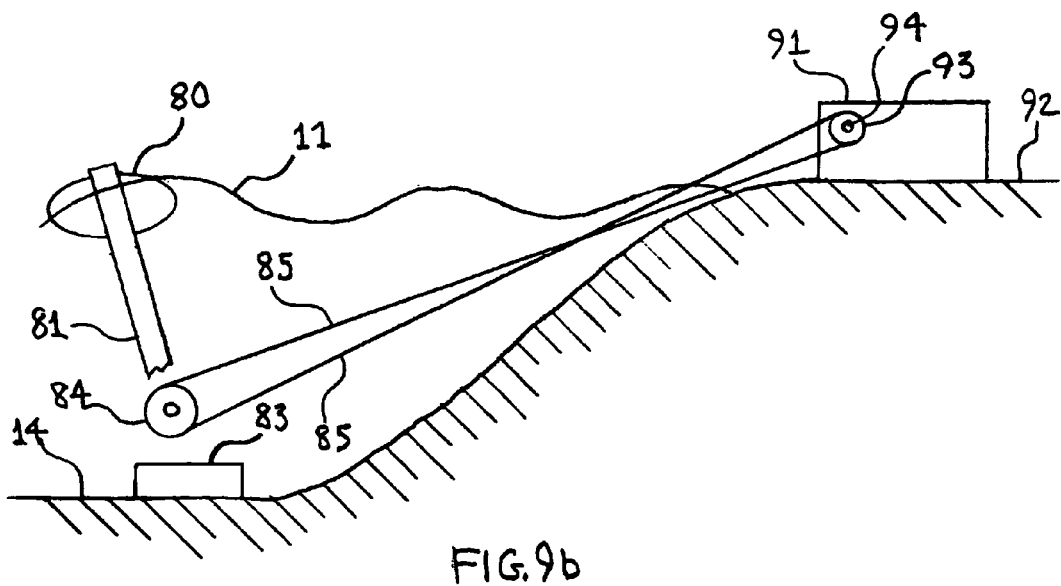
FIG. 9b: side view of sliding surging WEC with cutaway showing power-transmitting cable connected to an on-shore OSG.

FIG. 9b: side view of sliding surging WEC with cutaway showing power-transmitting cable connected to an on-shore OSG.

A power-transmitting cable (85) is shown wrapped round the power wheel (84) and also wrapped round a wheel (93) that turns on a shaft (94) mounted in a housing (91) on the shore (92). The shaft (94) drives an OSG (not shown).

When the blade (80) is struck by incoming surge, the blade (80) and the arms (81) are rotated on the upper shaft (82). The assembly continues to rotate until the surge weakens and the buoyancy of the blade (80) and arms (81) becomes the dominant force. As the surge reverses, the assembly reverts to the upright position. The reversing surge then pushes the blade (80) in the opposite direction. The cycle repeats. The oscillation of the upper shaft (82) is transmitted by the cable (85) to the shore-based OSG.

By operating the winch (90), the position cables (88) are used to adjust the height of the blade (80) in the arms (81). This allows the blade height to be adjusted for differing tidal levels. The cables (88) also enable tuning over a wide range. By design the mass MOI of the blade (80) and the arms is large. The mass MOI is dominant because a high added mass MOI implies drag losses. At the same time, the blade (80) and the top of the arms (81) are highly buoyant. As a result the period of the device is 15 seconds, but the water-plane area of the blade (80) and the arms (81) is small relative to the maximum possible water-plane area.

By pulling the blade (80) down, the water-plane area is increased by 9×. This reduces the period to 5 seconds.

Since the distance of adjustment of the blade (80) is small, the winch (90) does not need to be high-powered. A small locking winch will suffice, operating through a large gear train.

FIG. 10a: side view of a rotating LAM blade surging WEC.

A buoyant LAM blade (100) is fixed to a shaft (101) and rotates on it. The blade projects beyond the waterline as indicated by the swell (11). The shaft (101) is held in bearings (not shown) that are fixed in a foundation (102). The foundation (102) is fixed to the seabed (14). Fixed to the shaft (101) and rotating with it is a power wheel (103). Wrapped round the power wheel is a power-transmitting cable (104). The shaft (101) is aligned with the surge direction (89) and the blade (100) is tilted so that surge forces cause the blade (100) to move at right angles to the surge. The power-transmitting cable (104) runs round a tilted pulley (not shown) that turns the cable through a right angle. The cable runs to an OSG on the shore (see FIG. 9b).

FIG. 10b: plan view showing blade cross-section.

The blade (100) is shown tilted with respect to the surge. The tilt is selected to give the best lift to drag ratio for the velocity of operation. Since the velocity of the flow past the blade (100) varies with radial distance, the optimum blade (100) may be twisted.

FIGS. 10c and 10d: side views showing tuning with movable internal masses.

The blade (100) is tuned by moving a dense internal mass (105). Tuning over a range of 3× is achieved by changing the radius of gyration by 3×. This is made possible by minimizing the fixed mass and the fixed added mass of the blade (100) as already discussed. FIG. 10c shows the dense mass (105) near the lower end of the blade (100). The period of oscillation is 5 seconds. FIG. 10d shows the dense mass (105) near the top of the blade (100). The period of oscillation is 15 seconds.

The incoming surge causes the blade (100) to rotate. The rotation continues until buoyancy forces overcome the surge force. As the surge weakens, the rotation starts to reverse. As the surge reverses, the blade rotates in the opposite direction. The cycle repeats. The blade must be long enough to function through variations in tidal height. In principle the blade can be any height that is required for the desired range of tuning.

Figure 11A:
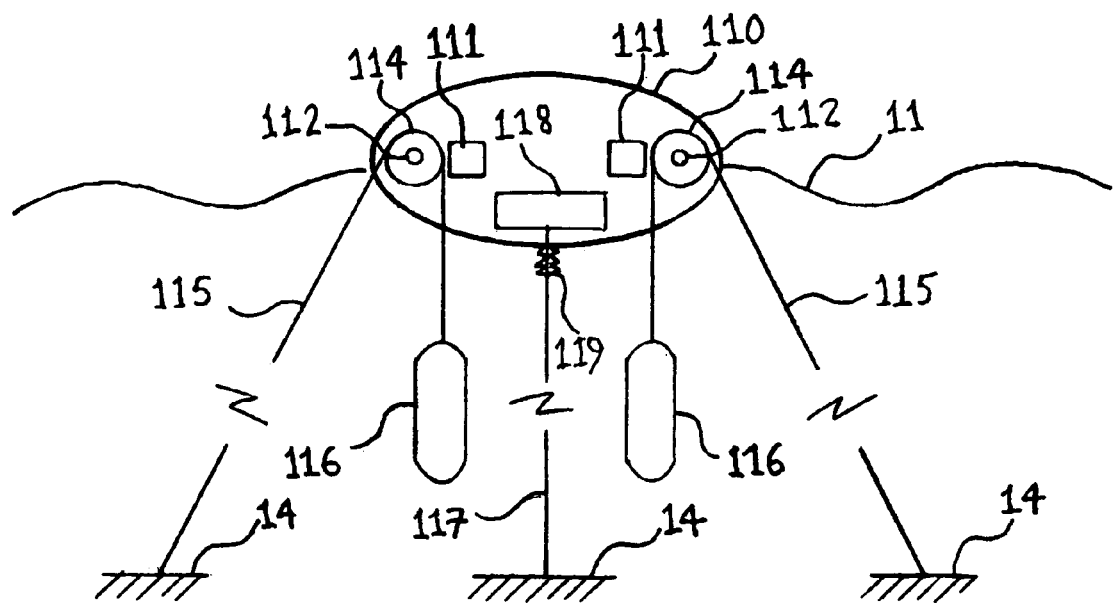
FIG. 11a: side view in cross-section of omnidirectional surging WEC.

FIG. 11a: side view in cross-section of omnidirectional surging WEC.

FIG. 11a shows a cross-section of a floating surging body (110) with four OSGs (111) arranged with radial symmetry.

Figure 11B:
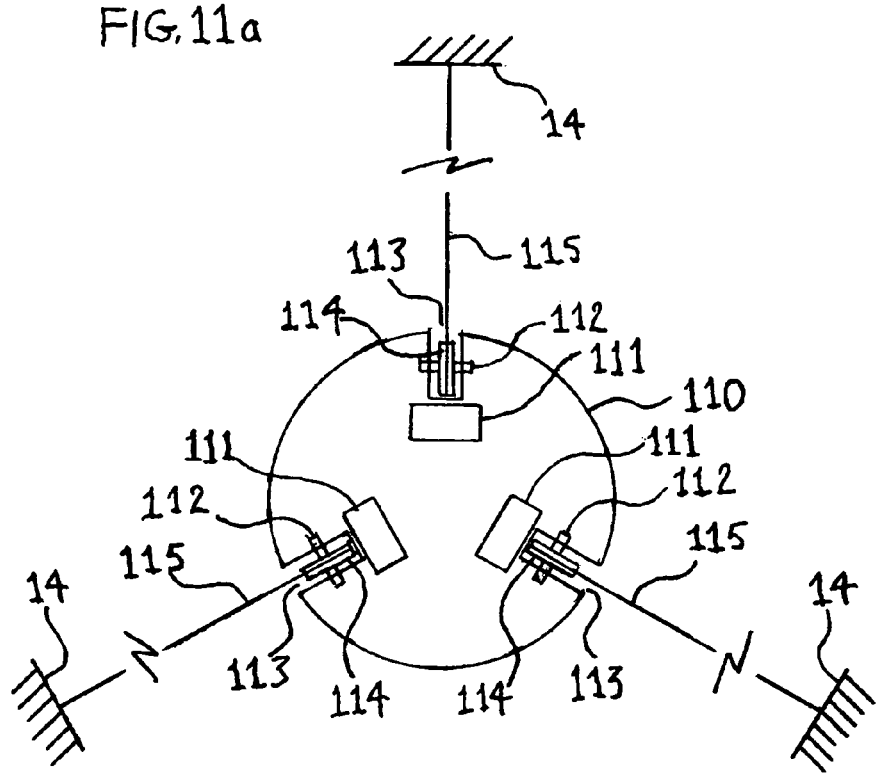
FIG. 11b: plan view in cross-section showing arrangement of multiple OSGs.

FIG. 11b: plan view in cross-section showing arrangement of multiple OSGs.

FIG. 11b shows a plan view in cross-section of a floating surging body (110) with three OSGs (111) arranged with radial symmetry.

The buoyant surging body (110) floats on the swell (11) in an offshore location. The body (110) is radially symmetrical and curved to capture surge forces from any direction with minimum drag losses. A LAM disc is appropriate. In order to capture power from any direction, the body (110) has at least three OSGs (111) (no detail shown) fixed symmetrically inside the body (110) at equal radial spacing and near the circumference of the vessel (110). The OSGs (111) are driven by shafts (112) that pass through bearings (not shown) in the external wall of the surging body (110) and bridge notches (113) in the circumference of the body (110). Inside the notches (113) external wheels (114) are fixed to, and rotate upon, the shafts (112). Cables (115) are looped round the wheels (114). One end of each cable (115) is fixed to the seabed (14). The other end of each cable is fixed to a counterweight (116)

At the bottom center of the surging body (110) a position cable (117) passes through the floor of the body (110) and round a small, highly geared electric winch (118) fixed to the interior of the body (110). A flexible bellows (119) seals the cable to the body (110). Since the range of travel of the position cable is small, the bellows (119) need accommodate only minor changes in length. The other end of the position cable (117) is fixed to the seabed (14).

A swell from any direction tilts the surging body (110) and moves it sideways. As a result, the cables (115) connected to all three OSGs (111) move with respect to the body (110). As the surge reverses, the body (110) reverts to its previous position. The cycle repeats. Reciprocating motion of the cables (115) is translated to electrical power.

Tuning is by using the winch (118) to vary the water-plane area. By design the floating body has high mass and high buoyancy so that the natural water-plane area is small relative to the potential water-plane area. As a result the period of oscillation is 15 seconds. By pulling on the position cable (117), the water-plane area is increased by 9× and the period falls to 5 seconds FIG. 12a: side view in cross-section of pitching LAM blade tuned by movable masses with short period.

A pitching LM and LAM blade (120) floats on a swell (11). Internal balanced dense movable masses (121) are close to the pitching axis. The pitching period is short.

FIG. 12b: side view in cross-section of pitching LAM blade tuned by movable masses with long period.

A pitching LM and LAM blade (120) floats on a swell (11). Internal balanced dense movable masses (121) are close to the ends of the blade (120). The pitching period is long.

FIG. 12c: front view in cross-section of LAM blade, approximately to scale.

The blade (120) has an optimal fineness ratio.

FIG. 12d: plan view of pitching LAM blade tuned by variable angle fins: short period. The blade (120) has variable angle fins (122) at each end. The fins are aligned with the pitching motion and added mass is low. Therefore the pitching period is short.

FIG. 12d: plan view of pitching LAM blade tuned by variable angle fins: short period.

The blade (120) has variable angle fins (122) at each end. The fins are at right angles to the pitching motion and added mass is high. Therefore the pitching period is long FIG. 12f: side view of pitching LAM blade showing location of fins.

The fins (122) are mounted on the keel of the LAM blade (120).

FIG. 13a: plan view of pitching WEC comprising a cylinder with LAM blades attached.

A pitching floating body (130) comprises a cylinder (131) with attached symmetrical LAM blades fore (132) and aft (133). The cylinder (131) rotates on a shaft (134) that passes through bearings (135) fixed in the ends of the cylinder (131) on the cylinder axis. The cylinder axis is also the pitching axis. The shaft (134) on each side of the cylinder (131) connects to a rigid yoke (136) that passes under the front blade (132). Rigidly connected to the aft blade (133) is a vane (137) that ensures that the pitching body aligns with the dominant swell when tethered from the pitching axis. The vane (137) is a rigid thin vertical plate with low mass.

FIG. 13b: side view of the same showing tethering by crank arm to a pseudo-stationary (PS) platform.

The pitching body (130) floats on the swell (11). The yoke (136) is attached to a buoyant crank arm comprising an upper crank arm (138) and a lower crank arm (139). The upper arm (138) is connected to the lower arm (139) by a vertically acting hinge (1310). The lower arm (139) is connected to a pseudo-stationary platform (1311) by a highly compliant joint (1312) that is a combination of universal joint and rotating bearing. The platform (1311) is tethered to the seabed (14) by mooring lines (1313). The two-arm construction of the crank arm enables it to follow the orbital pitching motion of the cylinder (131). The highly compliant joint (1312) enables the crank arm to accommodate rolling and yawing motion of the pitching body (130) and to rotate and align with a dominant swell of varying direction.

FIG. 13c: plan view of PS platform.

The PS platform (1311) is tethered by at least three lines (1313) at equal radial spacing. Four lines (1313) are shown. The PS platform (1311) comprises a large mass with large drag surfaces (not shown) and net buoyancy. The natural oscillation period of the PS platform greatly exceeds the upper range of swell periods. To reduce wave disturbance it is preferably at least 5 meters below the surface.

As the body (130) pitches, there is relative rotating motion between the shaft (134) and the cylinder (131). This enables an OSG (not shown) to be used inside the cylinder (131).

An alternative PTO system places the OSG in a watertight housing on the PS platform (1311). A cable is fixed to the axis of the cylinder (131) and loops round a wheel on the OSG and terminates in a suspended counter-weight. This system is not shown but is indicated, for example, in FIG. 1. This method reduces the fixed mass of the floating body and so aids tuning.

The cylinder (131), or any other floating body with a constant radius about the pitching axis, has negligible added mass in pitching. This is helpful in seeking wide variation in the vessel oscillation period. By using LM construction and LAM blades fore and aft and using the tuning methods described in FIG. 12, oscillation periods in the range 5 to 15 seconds are possible.

The scale of this body is limited to around 40 m length since at 60 m there is bridging of 5 second swells. Scale is unlimited in the sense that many 40 m devices can be used.

Figure 14:
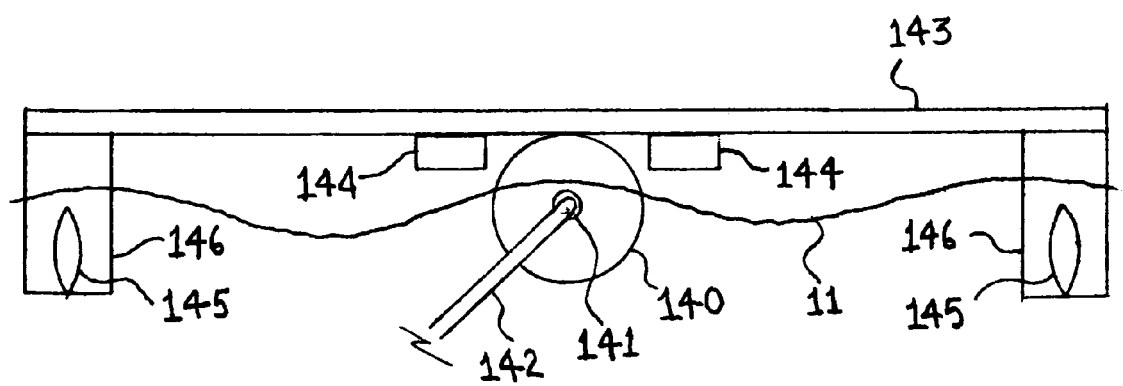
FIG. 14: side view of pitching cylinder WEC showing out-of-water support.

FIG. 14: side view of pitching cylinder WEC showing out-of-water support.

A floating cylinder (140) pitches on the swell (11). A shaft carried on bearings (141) in the axis of the cylinder (140) is connected by a yoke (142) to a submerged crank arm that is fixed to a PS platform (not shown but see FIG. 13). The PTO system can be an OSG (not shown) either in the cylinder (140) or on the PS platform as already described. Fixed over the cylinder is an LM structure (143) that carries movable dense masses (144) and at the ends are variable angle fins (145) on LAM blades (146). A vane can be attached to aid self-alignment to the dominant swell as shown in FIG. 13. 137). This is omitted.

In this configuration, fixed added mass is reduced by not using a submerged blade. The LM structure can use any or all of the materials and methods discussed for structures with high specific strengths.

Operation and tuning are as already described for FIG. 13. The scale is limited to around 40 m length.

Figure 15A:
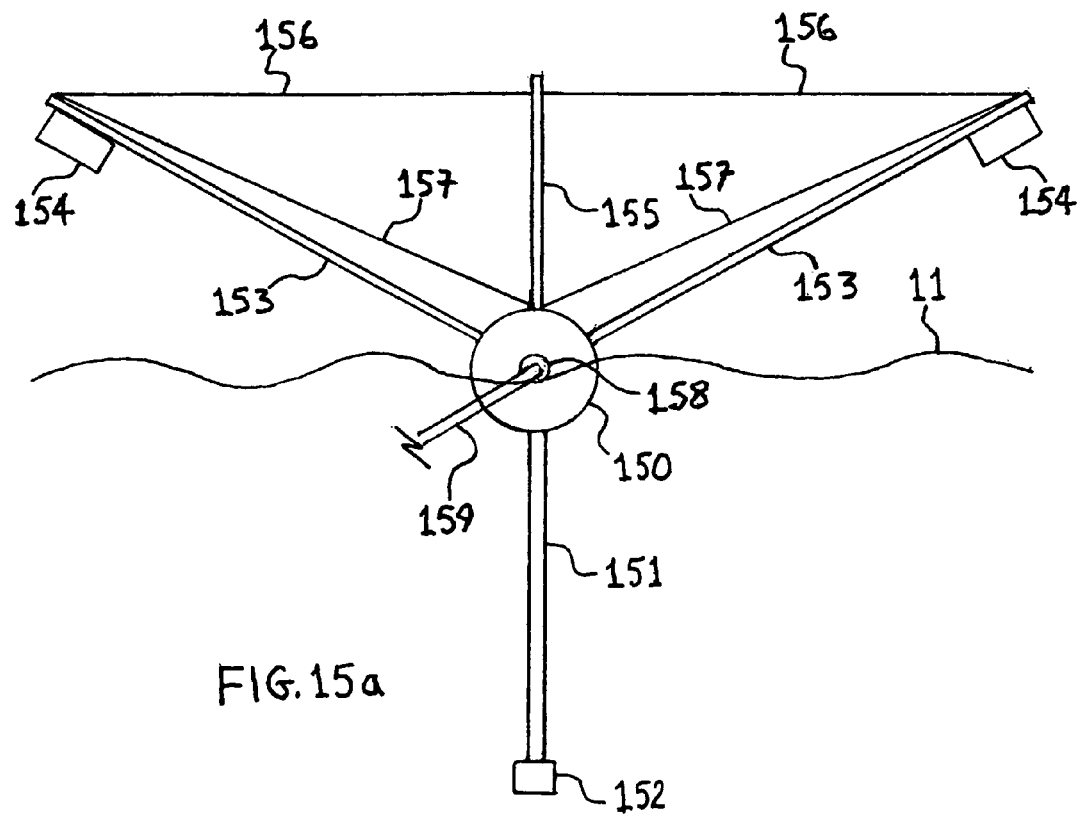
FIG. 15a: side view of pitching cylinder WEC with gravity restoring force.

FIG. 15a: side view of pitching cylinder WEC with gravity restoring force

Figure 15B:
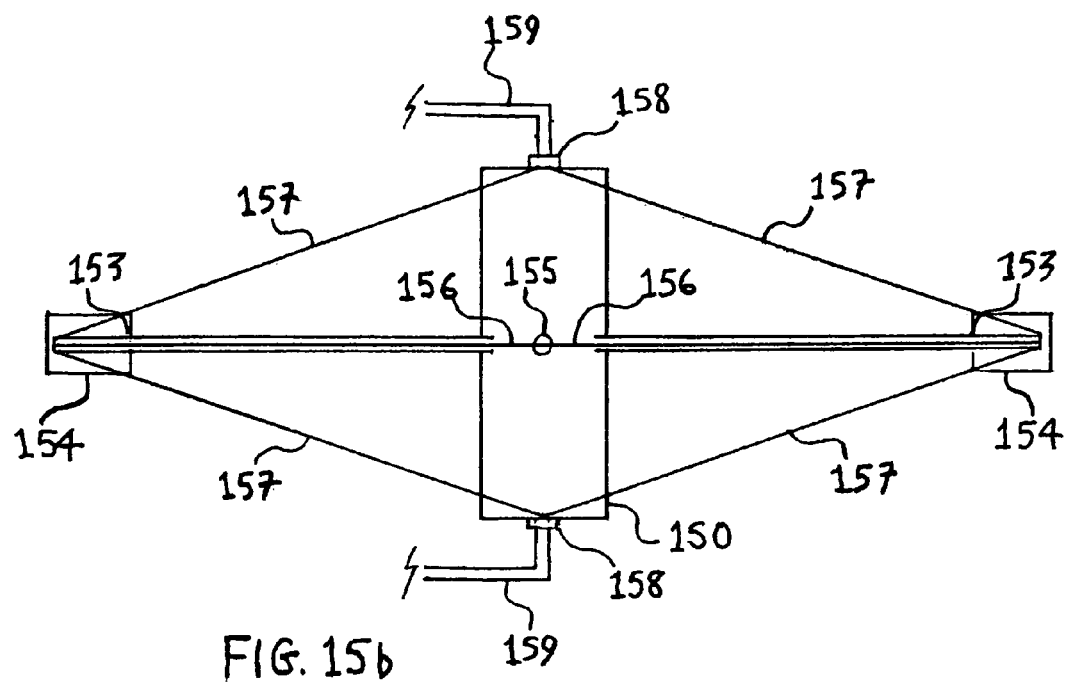
FIG. 15b: plan view of pitching cylinder WEC with gravity restoring force.

FIG. 15b: plan view of pitching cylinder WEC with gravity restoring force

A floating cylinder (150) pitches on the swell (11). Fixed to the underside of the cylinder (150) and aligned with the axis of the cylinder (150) is a rigid vertical keel spar (151) terminating in a dense keel mass (152). The spar (151) and the keel mass (152) are both streamlined in the pitching plane. Fixed at an angle to the top of the cylinder are two symmetrical rigid tuning spars (153). Attached to the tuning spars (153) and sliding on them are two symmetrical dense movable masses (154). The tuning spars (153) are supported by a LM structure that exploits the strength of materials in tension. A vertical spar (155) is fixed to the top of the cylinder (150) and rigid elements under tension (156) connect the top of the vertical spar (155) to the ends of the two tuning spars (153). Other rigid elements under tension (157) connect the ends of the cylinder to the ends of the tuning spars. A vane (not shown) can be attached to aid alignment with the dominant swell.

A rigid yoke (159) turns on bearings (158) in the wall of the cylinder (150). As discussed under FIG. 13, the relative motion of the yoke (159) and the cylinder enables an OSG to be used either in the cylinder or on a PS platform (not shown).

Tuning is by sliding the dense masses (154) symmetrically about the pitching axis. To vary the period by 3× requires the radius of gyration to vary by 3×. By design, the fixed mass and the fixed added mass are low so that 3× variation is possible.

The controlling restoring force is not buoyancy but gravity. The ends of the device remain largely above the sea and so wave bridging does not occur. There are no scale limits except those set by strengths of materials.

In the event of extreme weather, first the WEC is claimed. Then tanks (not shown) in the cylinder (150) are flooded and the WEC is submerged to safety.

FIGS. 16a to 16d: side views of different configurations of a wave-following WEC.

A rational design of a wave following WEC (a) does not proliferate segments and (b) ensures that the segment length corresponding to the peak of the annual wave energy spectrum is available. The peak period for energetic swells is typically 8 to 10 seconds. The optimum length is therefore around half a wavelength at these periods or 50 to 80 meters. In these figures, the selected 'peak' length is 70 m. The drawings are roughly to scale.

Figure 16A:
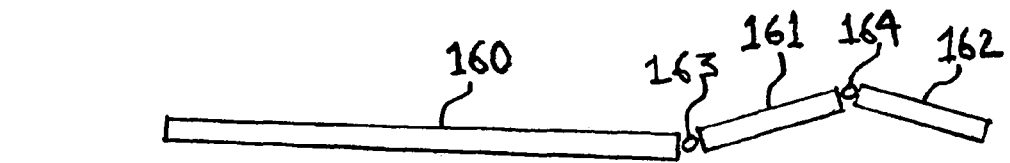
FIGS. 16a to 16d: side views of different configurations of a wave-following WEC.

FIG. 16a: the wave-follower comprises three segments. Segment 1 (160) is 70 m long. Segment 2 (161) is 20 m long. Segment 3 (162) is also 20 m long.

The fore part of segment 1 is tethered and has its own PTO. This is not shown.

The first link between segments 1 and 2 (163) is unlocked. The second link between segments 2 and 3 (164) is unlocked. This configuration is tuned to 9 seconds and 5 seconds.

Figure 16B:
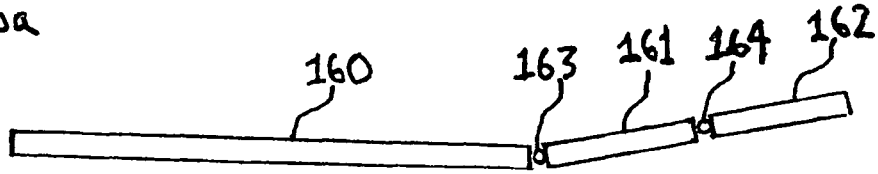

FIG. 16b. The second link (164) only is locked. The system is tuned to 9 seconds and 7 seconds.

Figure 16C:
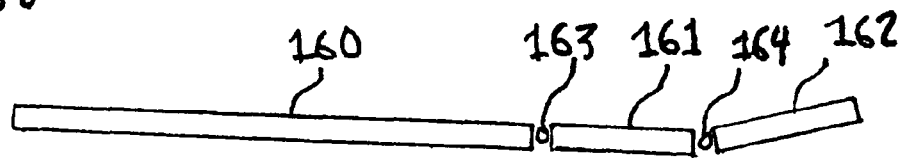

FIG. 16c. The first link only is locked. The system is tuned to 10 seconds and 5 seconds.

Figure 16D:
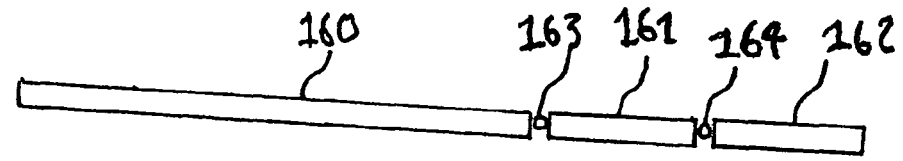

FIG. 16d: Both links are locked. The system is tuned to 12 seconds

This design allows tuning from 5 to 12 seconds period. At 15 seconds period, the 12 second configuration will still be effective even if not optimal.

Figure 16E:
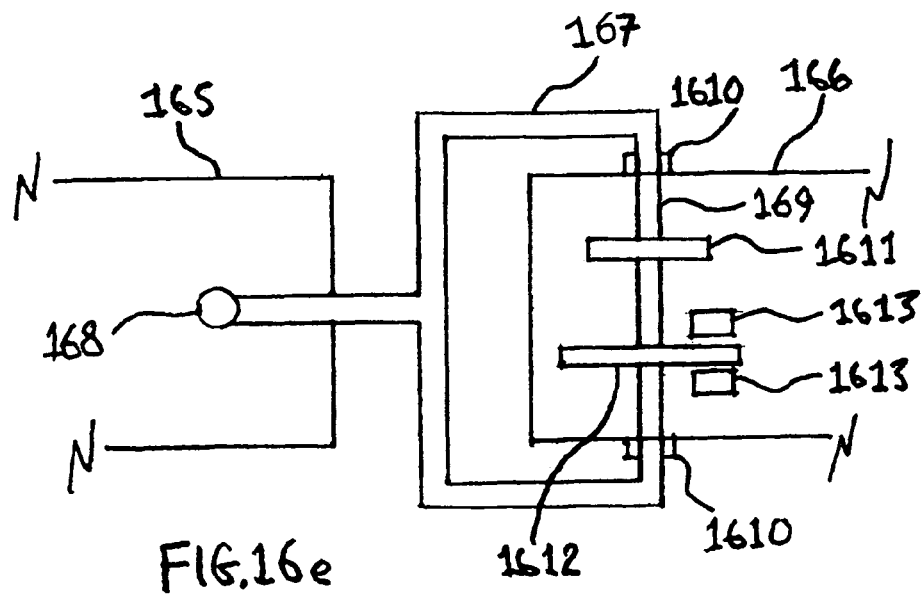
FIG. 16e: plan view in cross-section of a segment locking mechanism.

FIG. 16e: plan view in cross-section of a segment locking mechanism.

A first floating segment (165) is linked to a second floating segment (166) by a rigid yoke (167). The yoke (167) rotates on a horizontally acting hinge (168) on the first segment (165) and on a shaft (169) that passes through the second segment (166), carried on bearings (1610). The link is therefore a universal joint. Fixed to the shaft (169) inside the second segment (166) is a gear wheel (1611) that transmits power to an OSG gear train (not shown). Also fixed to the shaft (169) inside the second segment (166) is a disc (1612). On each side of the disc (1612) are brake pads (1613). The link between the two segments (165, 166) is locked by applying these pads (1613) to the disc (1612).

The invention claimed is:

1. A wave energy converter dynamically tunable over a wide range, meaning over a significant part of the range of periods that characterise high energy swell, comprising:
   a. at least one buoyant body arranged to oscillate under the influence of ocean swell;
   b. means for aligning said buoyant body with the dominant swell;
   c. a power take off system;
   d. a control system, comprising means for collecting data on the prevailing sea-state and means for calculating adjustments to the disposition and oscillation period of said buoyant body;
   e. means for dynamically varying the oscillation period of said buoyant body said means being selected from at least one of:
      i varying the total mass of said buoyant body by adding or subtracting mass;
      ii arranging said buoyant body to oscillate by rotation about an axis and by arranging movement of mass to and from said axis along a radius to said axis;
      iii varying the water-plane area of said buoyant body;
   f. said variation in total mass of said buoyant body excluding significant pumping of seawater;
   g. said buoyant body being arranged to significantly limit the level of fixed mass moment of inertia (MOI) of said buoyant body by means of streamlining in the direction of oscillation of said buoyant body, whereby said tuning over a wide range is enabled;
   h. said buoyant body having a low fixed mass MOI meaning a fixed mass MOI that is less than 20% of the maximum variable sum of mass MOI and added mass MOI and preferably less than 10% of said maximum sum, whereby said tuning over a wide range is enabled;

i. means for controlling bridging of waves by said buoyant body whereby limits to tuning range can be controlled.

2. A wave energy converter as claimed in claim 1 wherein said total mass of said buoyant body can be varied by means of:
   a. at least one submerged mass that is substantially neutrally buoyant;
   b. said submerged mass being substantially streamlined in the direction of oscillation;
   c. a controllable variably compliant coupling between said buoyant body and said submerged mass;
   d. said compliant coupling having a locked position wherein said coupling is a rigid connection between said buoyant body and said submerged mass whereby said buoyant body and said submerged mass move together;
   e. said compliant coupling having an unlocked position wherein said coupling is disconnected from said buoyant body, whereby said submerged mass floats freely.

3. A wave energy converter as claimed in claim 2 wherein:
   a. said buoyant body is arranged to oscillate in the heaving vector;
   b. attached to the underside of said buoyant body is a rigid vertical rod;
   c. said submerged mass is an annular structure slidably attached to said rod;
   d. said variably compliant coupling comprises at least one movable member fixed inside said submerged mass and adjacent to said rod and capable of being moved against said rod and attached to a powered actuator;
   e. said submerged mass contains a controllable trimming tank, whereby the buoyancy of said submerged mass can be varied.

4. A claim as in claim 1 wherein said varying of said total mass of said body is by varying the added mass of said buoyant body, by using variable angle fins and the angle of said fins is variable continuously between alignment with said oscillating motion of said body and a position at right angles to said alignment.

5. A claim as in claim 4 wherein said variable angle fins are located inside enclosures whereby the added mass effect and mass effect of said fins are increased.

6. A claim as in claim 1 wherein said varying of said total mass of said buoyant body is by trapping and releasing of seawater using means that avoid drag.

7. A claim as in claim 6 wherein said means of avoiding drag is the closing of open-ended tubes at both ends with streamlined bodies, whereby the combination of said tubes and said streamlined bodies is itself a streamlined body.

8. A claim as in claim 1 wherein said varying of total mass of said buoyant body is by locking and unlocking the links between a series of floating bodies and said locking and unlocking provides at least one rigid immersed length of floating body that substantially equals the half-wavelength of the swell period corresponding to peak annual swell energy at the location of said wave energy converter.

9. A claim as in claim 8 wherein said locking and unlocking is by means of brakes to stop the rotation of a shaft, and said shaft passes through the interior of a first floating body and is fixed to a yoke that connects to a second floating body.

10. A claim as in claim 1 wherein said buoyant body is arranged to oscillate by rotation about an axis by fixing said buoyant body to an arm that rotates on a substantially fixed axis.

11. A claim as in claim 1 wherein said low fixed mass moment of inertia (MOI) derives from using at least one of:
    a. construction materials with strength to weight ratios at least 2× conventional structural steel;
    b. sandwich composites with strength to weight ratios at least 2× conventional structural steel;
    c. stressed skin methods of construction;
    c. space frame methods of construction;
    d. locating heavy components of said wave energy converter outside said buoyant body.

12. A claim as in claim 1 wherein said level of fixed added mass MOI of said buoyant body is significantly limited, meaning a fixed added mass MOI that is less than 20% of the fixed mass MOI of said buoyant body and preferably less than 10%, whereby said tuning over a wide range is enabled.

13. A claim as in claim 12 wherein said significantly limited added mass MOI is achieved by using at least one of:
    a. streamlining of said buoyant body in the direction of oscillation and said streamlining employs a fineness ratio in the range of 3 to 10 and preferably 4.5;
    b. said buoyant body is arranged to pitch and has a submerged exterior surface defined by one or more constant radii about the pitching axis;
    c. said buoyant body is arranged to pitch and a substantial part of the pitching extremities of said buoyant body is arranged to be out of the water.

14. A claim as in claim 1 wherein said varying of said water-plane area of said buoyant body is by changing the vertical tension of a link between said buoyant body and a fixed submerged surface.

15. A claim as in claim 1 wherein said bridging of waves is controlled by at least one of:
    a. limiting the immersed length of said buoyant body to less than a single wave-length at the shortest desired period of oscillation of said buoyant body;
    b. varying the immersed length of said buoyant body by locking and unlocking adjacent serial segments;
    c. applying a gravitational restoring force to said buoyant body, whereby immersion of buoyant extremities of said buoyant body is avoided.

16. A claim as in claim 15 wherein said gravitational restoring force is provided by a weighted keel, streamlined in the pitching plane, fixed below said buoyant body that is a pitching cylinder pitching about the cylindrical axis and attached to said cylinder is an upward-angled symmetrical structure arranged to be out of the water and arranged so that masses kept in balance about the pitching axis can be moved to and from said axis, whereby dynamic tuning over a wide range is enabled.

17. A claim as in claim 1 wherein said means for aligning said buoyant body with said dominant swell is one of:
    a. a near-shore location of said body where said dominant swell has persistent direction;
    b. said body having radial symmetry whereby said body interacts equally with swell from all directions;
    c. means for automatic alignment with said dominant swell.

18. A claim as in claim 17 wherein said means for automatic alignment is one of:
    a. said buoyant body is arranged to pitch and is tethered by a yoke and said yoke is fixed to the fore section of said buoyant body;
    b. said buoyant body is arranged to pitch and is tethered by a yoke at its pitching axis and said yoke is arranged to rotate about said axis.

19. A claim as in claim 18 wherein said yoke arranged to rotate is attached to a crank arm comprising two sections wherein the two sections are joined by a vertically acting hinge and the lowest section is fixed to a submerged pseudo-stationary platform by a combination of universal joint and horizontally rotating bearing.

20. A claim as in claim 1 wherein said power take off system comprises a rotating shaft that is coupled to a rectifying ratchet wheel that is coupled to a speed-multiplying gear train that is coupled to an overrunning clutch that is coupled to a flywheel that is coupled to a rotary electrical generator, said rotating shaft being driven by one of:
  i. the relative motion of said buoyant body and a cable attached to a suspended counterweight;
  ii. the relative motion of said buoyant body and a cable attached to a another body;
  iii the relative motion of said buoyant body and an arm attached to another body.

* * * * *